US007612973B2

(12) United States Patent
Germain

(10) Patent No.: US 7,612,973 B2
(45) Date of Patent: Nov. 3, 2009

(54) GFCI RECEPTACLE WITH SINGLE BUTTON FOR TEST-RESET FUNCTION

(75) Inventor: Frantz Germain, Rosedale, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 317 days.

(21) Appl. No.: 11/469,314

(22) Filed: Aug. 31, 2006

(65) Prior Publication Data

US 2007/0133136 A1 Jun. 14, 2007

Related U.S. Application Data

(60) Provisional application No. 60/713,789, filed on Sep. 1, 2005.

(51) Int. Cl.
*H02H 3/00* (2006.01)
*H01H 73/00* (2006.01)

(52) U.S. Cl. .......................................... 361/42; 335/18

(58) Field of Classification Search .................. 361/42; 335/18
See application file for complete search history.

(56) References Cited

U.S. PATENT DOCUMENTS

| | | | |
|---|---|---|---|
| 4,409,574 A | 10/1983 | Misencik et al. |
| 5,847,913 A | 12/1998 | Turner et al. |
| 2004/0125519 A1 | 7/2004 | Germain et al. |
| 2005/0013067 A1 | 1/2005 | Germain et al. |

OTHER PUBLICATIONS

International Preliminary Search Report dated Oct. 29, 2008 for PCT/US06/34052; filed on Sep. 1, 2006.

*Primary Examiner*—Robert DeBeradinis
*Assistant Examiner*—Scott Bauer
(74) *Attorney, Agent, or Firm*—Collard & Roe, P.C.

(57) ABSTRACT

A resettable circuit interrupting device having a single button for activating a test/reset mechanism. The circuit interrupting device can include a reset lockout and/or reverse wiring protection.

20 Claims, 26 Drawing Sheets

GFCI RECEPTACLE WITH SINGLE BUTTON FOR TEST-RESET FUNCTION

This application claims the benefit of Provisional Application No. 60/713,789 filed Sep. 1, 2005.

BACKGROUND OF THE INVENTION

1. Field of the Invention

The present application is directed to resettable circuit interrupting devices including, without limitation, ground fault circuit interrupting devices (GFCI's), arc fault circuit interrupting devices (AFCI's), immersion detection circuit interrupting devices (IDCI's), appliance leakage circuit interrupting devices (ALCI's), equipment leakage circuit interrupting devices (ELCI's), circuit breakers, contactors, latching relays and solenoid mechanisms.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections respectively. The electrical wiring device industry has witnessed an increasing call for circuit breaking devices or systems which are designed to interrupt power to various loads, such as household appliances, consumer electrical products and branch circuits. In particular, electrical codes governing the wiring of commercial and residential units require electrical circuits in bathrooms and kitchens to be equipped with ground fault circuit interrupting devices (GFCI), for example. Presently available GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a second button, a reset button is used to reset the electrical connection between line and load sides. To avoid confusion as to which button does what, particularly when there is insufficient light to read the writing on the buttons to identify their functions, it would be desirable to have a single button which, when pressed, will perform the proper operation.

SUMMARY OF THE INVENTION

The circuit interrupting device of the present invention has a button to effect both a reset function and a test function. More specifically, when the circuit interrupting device is in the reset state (i.e., power can flow from the input terminals to the output terminals) and the button is depressed, the device will be urged to its trip state. If, however, the circuit interrupting device is in the trip state (i.e., no power can flow from the input terminals to the output terminals) the device will be urged to its reset state.

The foregoing has outlined the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numbers:

DETAILED DESCRIPTION OF EMBODIMENTS

Figure 1:
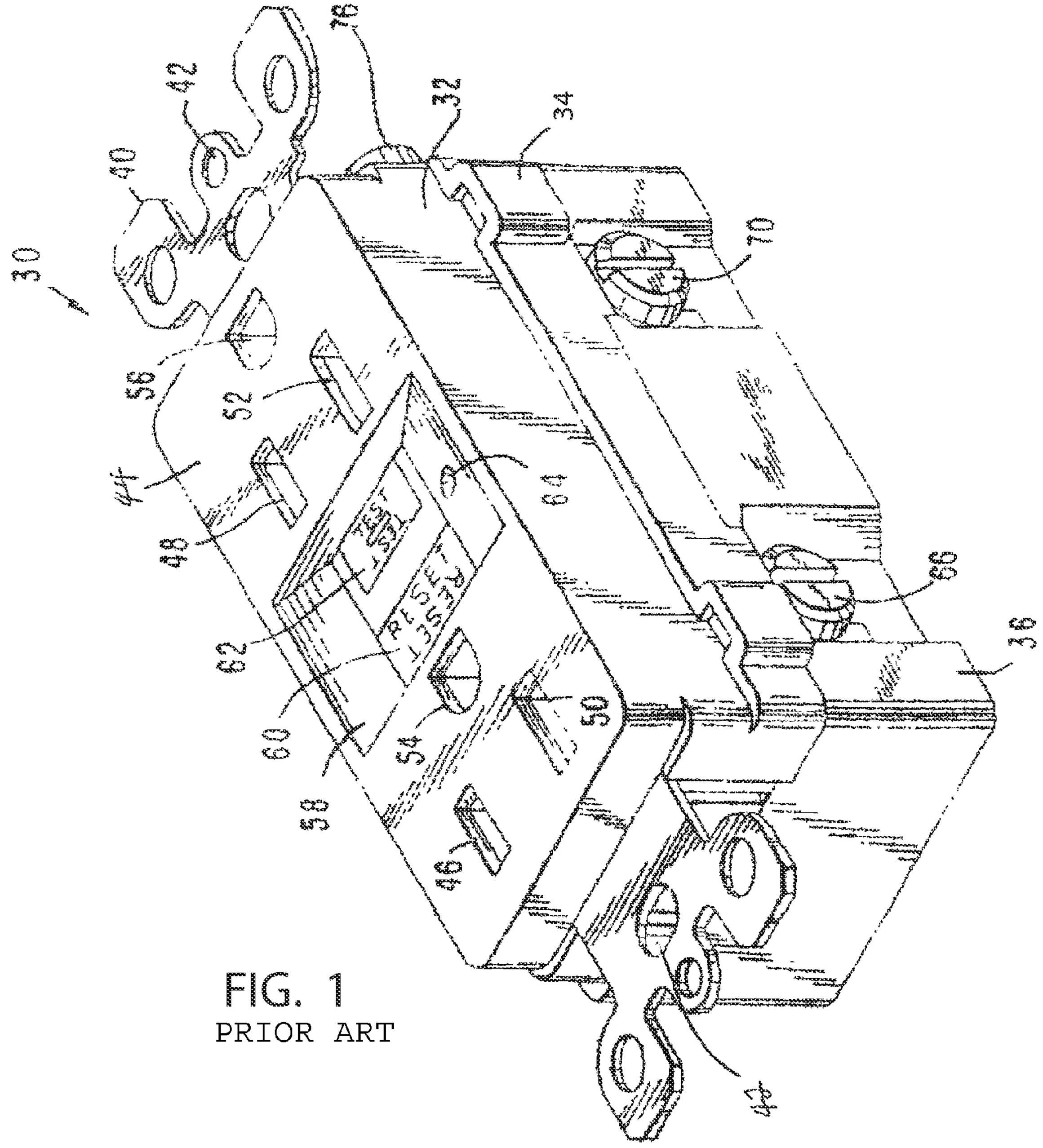
FIG. 1 PRIOR ART
FIG. 1 is a perspective view of a GFCI constructed in accordance with prior art.

The present application contemplates various types of circuit interrupting devices that are capable of breaking at least one conductive path at both a line side and a load side of the device. The conductive path is typically divided between a line side that connects to supplied electrical power and a load side that connects to one or more loads. As noted, the various devices in the family of resettable circuit interrupting devices include: ground fault circuit interrupting devices (GFCI's), arc fault circuit interrupting devices (AFCI's), immersion detection circuit interrupting devices (IDCI's), appliance leakage circuit interrupting devices (ALCI's) and equipment leakage circuit interrupting devices (ELCI's).

The present invention is directed toward reconfiguring a prior art circuit interrupting device designed to have two separate buttons, one for reset and one for test, to a new circuit interrupting device having a button. The button which performs both functions will herein after be referred to as the test-reset button. More specifically, the embodiment of the circuit interrupting device disclosed herein has a test-reset button for performing both the test and reset functions. The test-reset button is a single action button which, when pressed, engages both the reset button and test button of a prior art circuit interrupting device to cause both buttons to be depressed. In the embodiment disclosed, a latch plate component of the circuit interrupting device is modified to include an extension arm positioned to engage an angled tab on a latch holder. When the extension arm engages the angled tab on the latch holder, the latch holder and the step ring on the reset pin will hold the latch plate in an up position when the circuit interrupting device is in the reset state.

If, when the test-reset button is depressed, the circuit interrupting device d is in its reset state, the latch plate of the circuit interrupting device will allow the test button to cause the circuit interrupting device to be in its tripped state because the latch plate is being held in its up position.

If, however, the circuit interrupting device is in the tripped state when the test-reset button is depressed, the latch plate of the circuit interrupting device will be below the angled tab on the latch holder and will also be below the step ring on the shaft of the reset button. Now, as the test-reset button is pushed down, the reset button of the circuit interrupting device will move down and the test-reset button will function as a reset button to cause the solenoid of the circuit interrupting device to fire. Immediately thereafter, the latch plate will be picked up by the step ring on the shaft of the reset button and cause it to move upward along the angled tab on the latch holder until it engages and is held up by the top of the angled tab.

In the description which follows, FIGS. 1-20 and the description of these FIGS. describe an embodiment of a prior art circuit interrupting device having two buttons, a test button and a reset button. FIGS. 21-30 and the description which relates to these FIGS. describes an embodiment of the circuit interrupting device of the present invention having a single test-reset button which when depressed, engages the prior art circuit interrupting device depressing both the test and reset buttons of such a device causing the device to trip if it were reset or to reset if it were in a tripped state.

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The GFCI receptacles described herein have line and load phase (or power) connections, line and load neutral connections and user accessible load phase and neutral connections. The connections permit external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

The circuit interrupting and reset portions described herein preferably use electro-mechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths. In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if the circuit interrupting portion is non-operational, if an open neutral condition exists and/or if the device is reverse wired.

The above-described features can be incorporated in any resettable circuit interrupting device, but for simplicity the descriptions herein are directed to GFCI receptacles. A more detailed description of a GFCI receptacle is provided in U.S. Pat. No. 4,595,894, which is incorporated herein in its entirety by reference. It should also be noted that binding screws are exemplary of the types of wiring terminals that can be used to provide the electrical connections. Examples of other types of wiring terminals include set screws, pressure clamps, pressure plates, push-in type connections, pigtails and quick-connect tabs.

Figure 2:
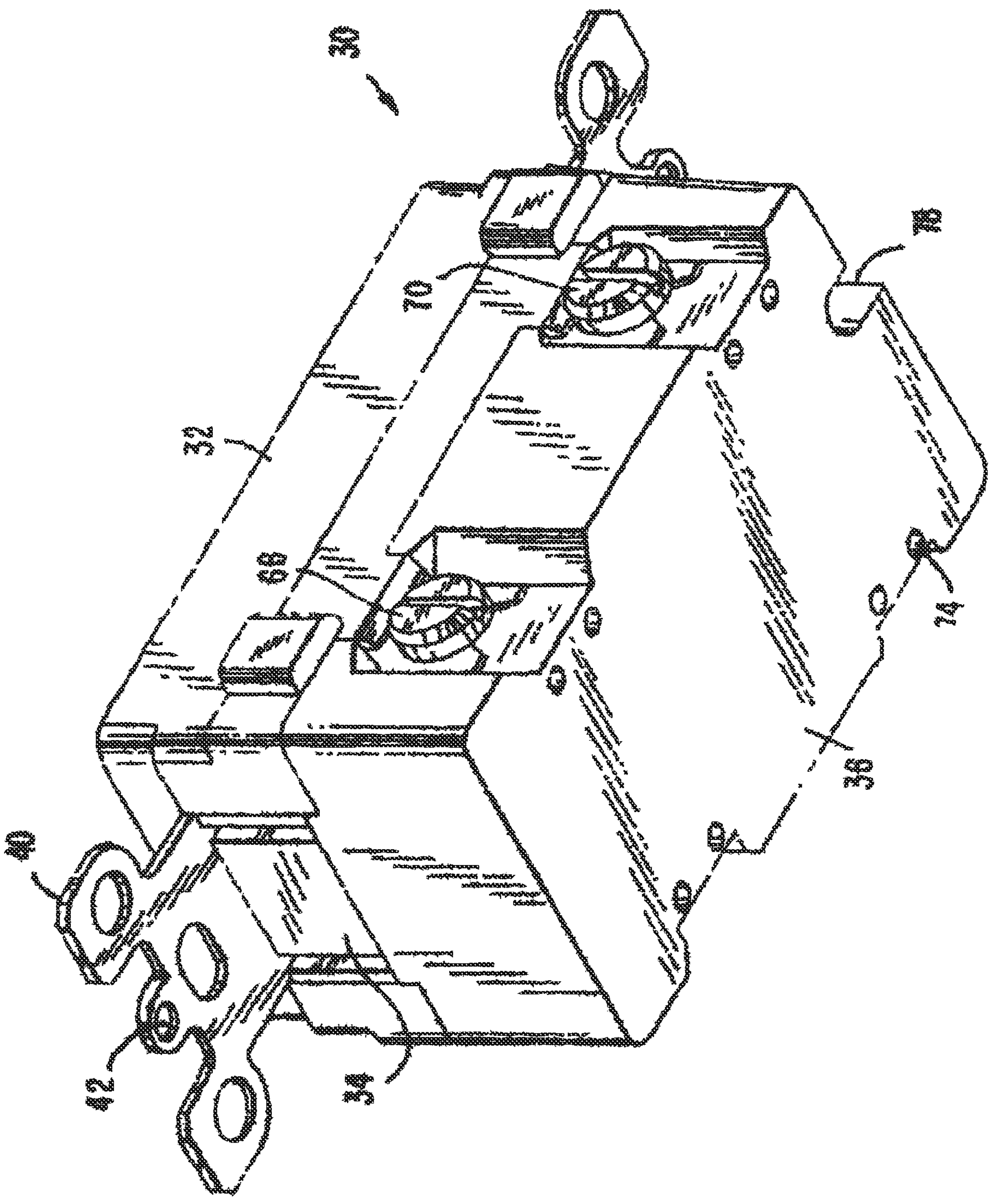
FIG. 2 PRIOR ART
FIG. 2 is a bottom perspective view of the GFCI of FIG. 1.

Turning now to FIGS. 1 and 2, a prior art GFCI 30 is shown. GFCI 30 is made up of a top cover 32, middle housing 34 and a bottom housing 36 held in assembly by the deflectable tabs (not shown) on bottom housing 36 engaging the U-shaped members on top cover 32. A mounting strap 40 is mounted between top cover 32 and middle housing 34 and has two apertures 42 to mount the GFCI 30 to the mounting ears of a standard gang box (not shown). Top cover 32 has a face 44 which contains two sets of slots each to receive a three-bladed grounded plug (not shown). Each set of slots is made up of a slot 46, 48 of a first length and a slot 50, 52 of a longer length and a U-shaped slot 54, 56 to receive the grounding prong of the plug. Because the slots 50, 52 are longer than the slots 46, 48 the plug is naturally polarized and conforms to NEMA standard 5-15R. In the depression 58 in top cover 32 is placed a reset button 60, a test button 62 and an indicator lamp means 64. Indicator lamp means 64 is a dual color lamp which produces a first color when a first filament is activated, a second color when a second filament is activated and a third color when both filaments are activated. Bottom housing 36 has a series of four terminal screws (only two of which are shown in the figures). Terminal screw 66 is connected to the load neutral terminal as will be described below. A similar terminal screw 68 is connected to the load phase terminal. Terminal screw 70 is connected to the line neutral terminal and a similar terminal screw 72 is connected to the line phase terminal as will be described below. Adjacent each terminal screw 66, 68, 70 and 72 are two apertures 74 to receive the bared ends of electrical conductors (not shown). As will be described below, the conductor ends extend between a terminal contact and a nut which engages the conductor and pushes it against the terminal contact as the terminal screw is advanced. At the rear wall of middle housing 34 is a grounding screw 76 to which may be fastened a ground conductor (not shown) inserted into slot 78.

Figure 3:
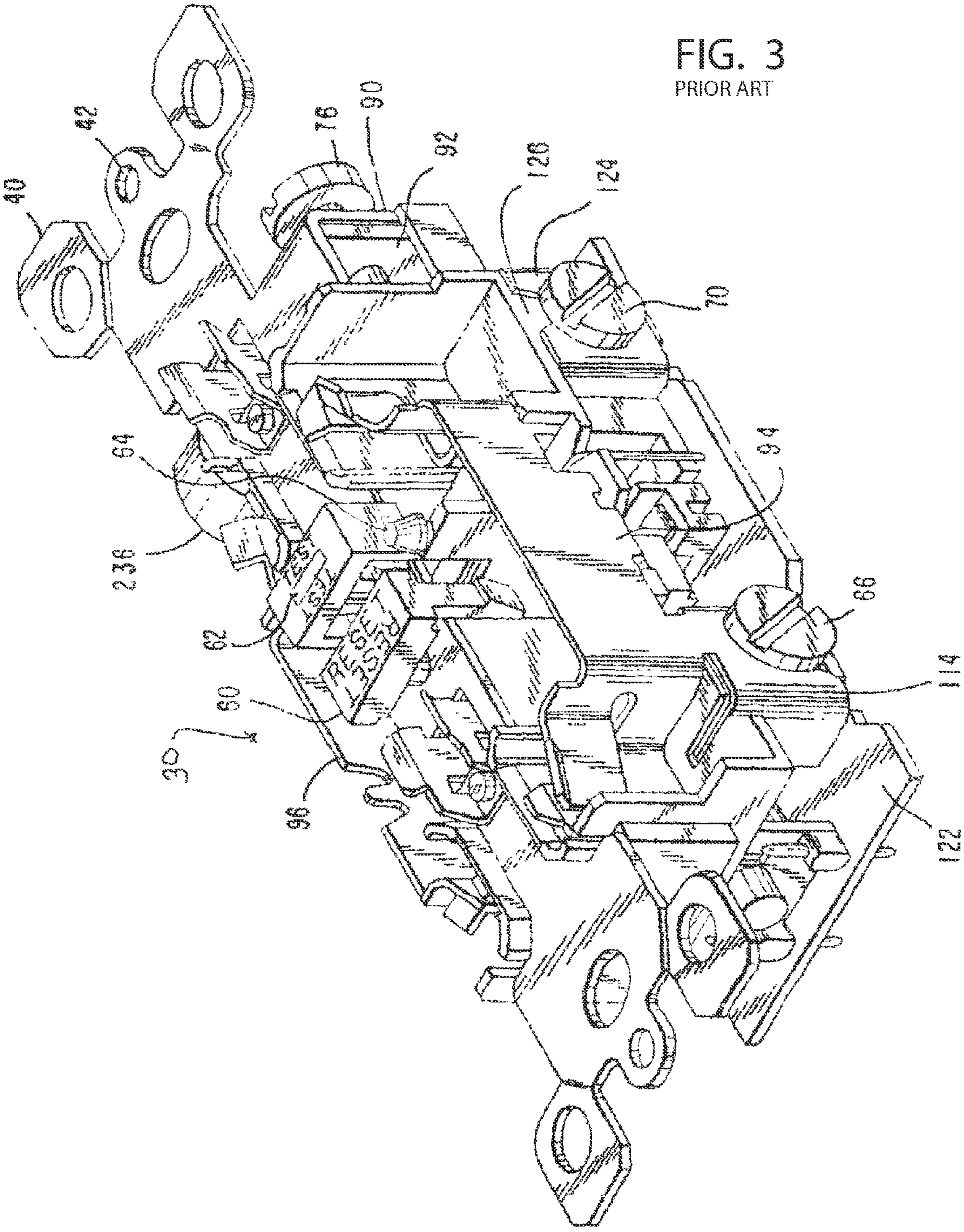
FIG. 3 PRIOR ART
FIG. 3 is similar to FIG. 1 but with the top and bottom covers of the GFCI removed.
Figure 4:
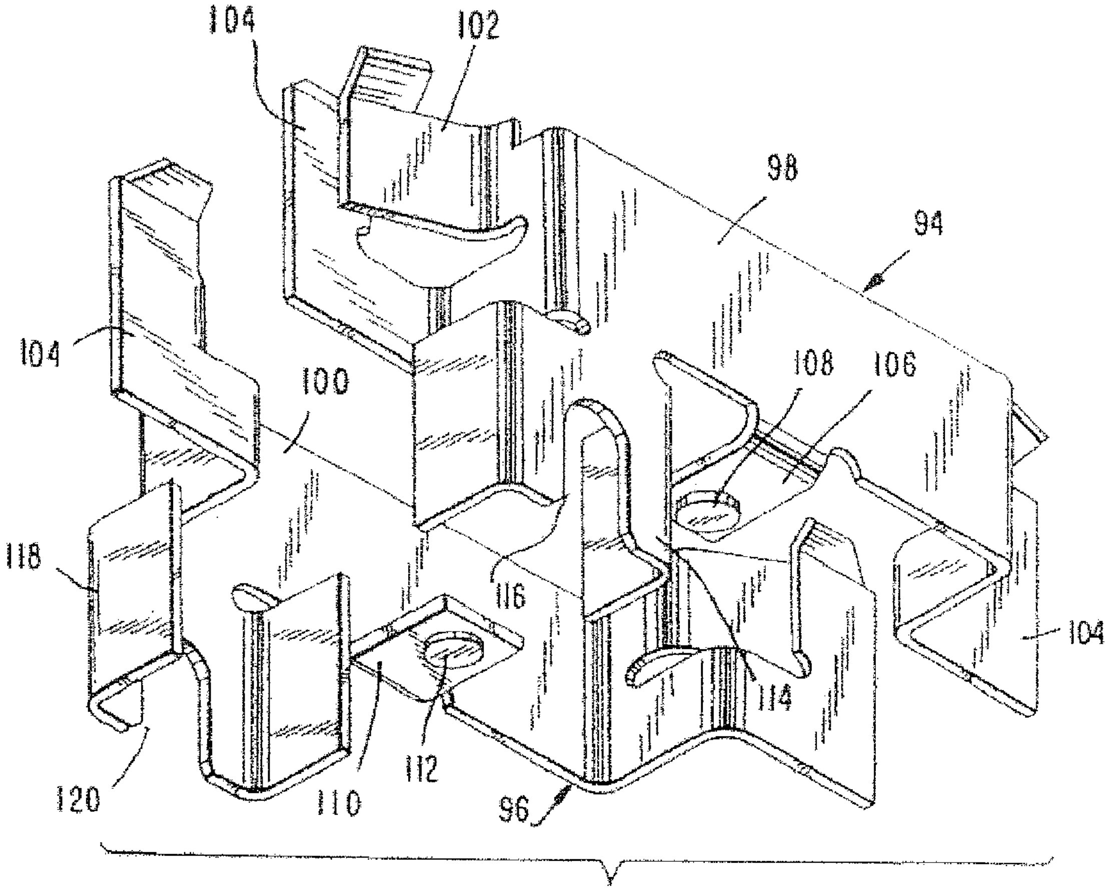
FIG. 4 PRIOR ART
FIG. 4 is a bottom perspective view of the load neutral and load phase terminals of the device of FIG. 1.

Turning now to FIG. 3 which shows GFCI 30 with the top cover 32 and the bottom housing 36 removed and FIG. 4 which shows details of the load phase and neutral terminals 94, 96. Each terminal 94, 96 has a central body portion 98, 100, respectively, with male blade grip fingers 102, 104 at each end. The male blades of the plug with fit between each pair of grip fingers 102, 104 to make mechanical and electrical contact with the male blades of the inserted plug. An interned tab 106 on load neutral terminal 94 receives the main fixed neutral contact 108 while inwardly bent tab 110 receives the main fixed phase contact 112. A depending three sided tab 114 has a slot 116 to receive therethrough the threaded portion of terminal screw 66. A similar depending three sided tab 118 has a slot 120 to receive therethrough the threaded portion of terminal screw 68.

Terminals 94, 96 of FIG. 4 are shown assembled to middle housing 34. Also mounted to middle housing 34 is the printed circuit board (hereafter PCB) 122 which contains the various circuits which determine the indicator lamp means color, its blinking rate and control the beeper. The PCB 122 also contains the various components of the fault detectors, transformers and solenoid as will be described below. Terminal screw 70 is connected to a tab 124 having a slot 126 therein to receive the threaded portion of terminal screw 70. A similar structure is present for terminal screw 72 not visible in the figure.

Figure 5:
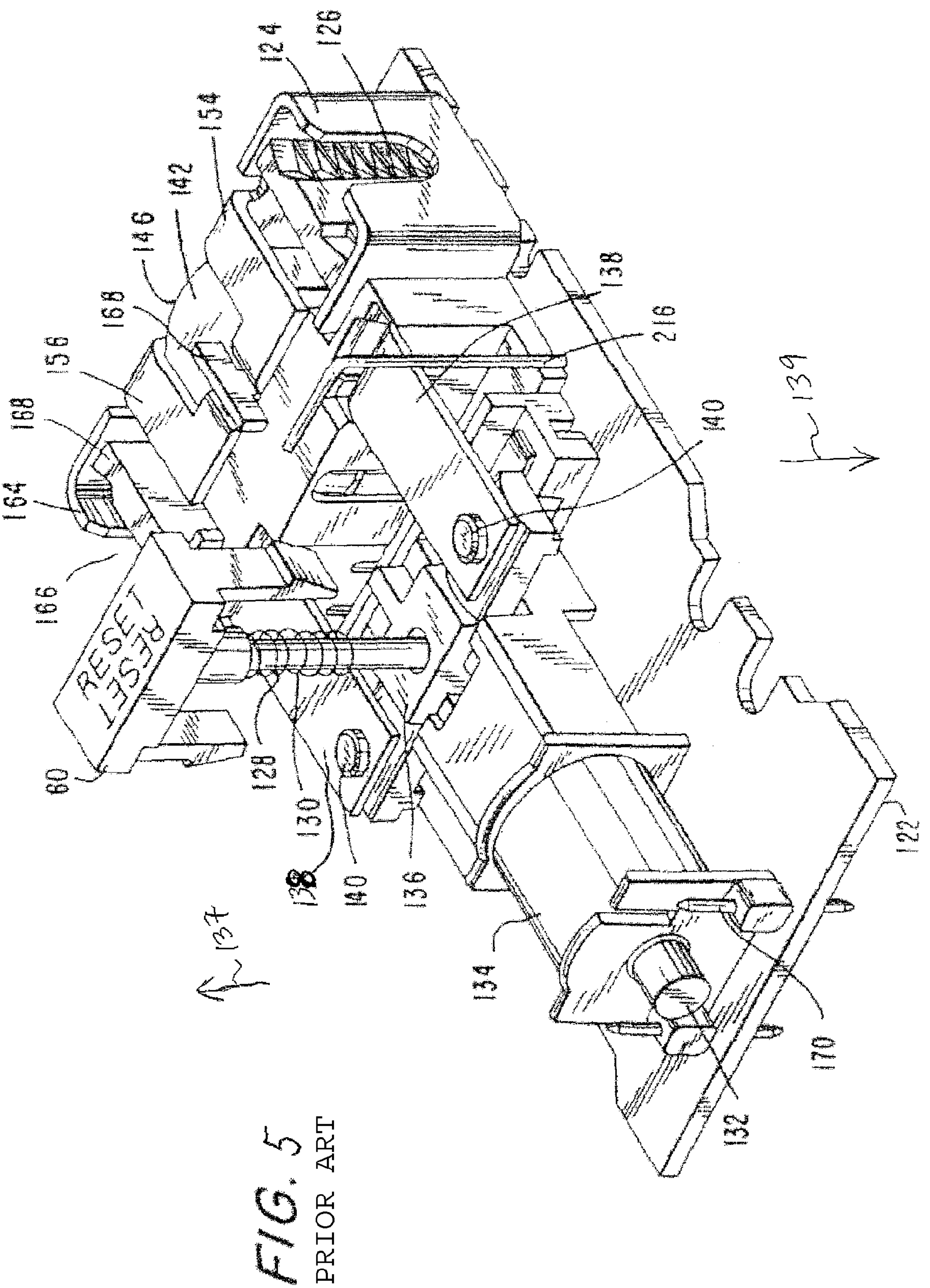
FIG. 5 PRIOR ART
FIG. 5 is a perspective view of the printed circuit board and reset assemblies of the device of FIG. 1.
Figure 6:
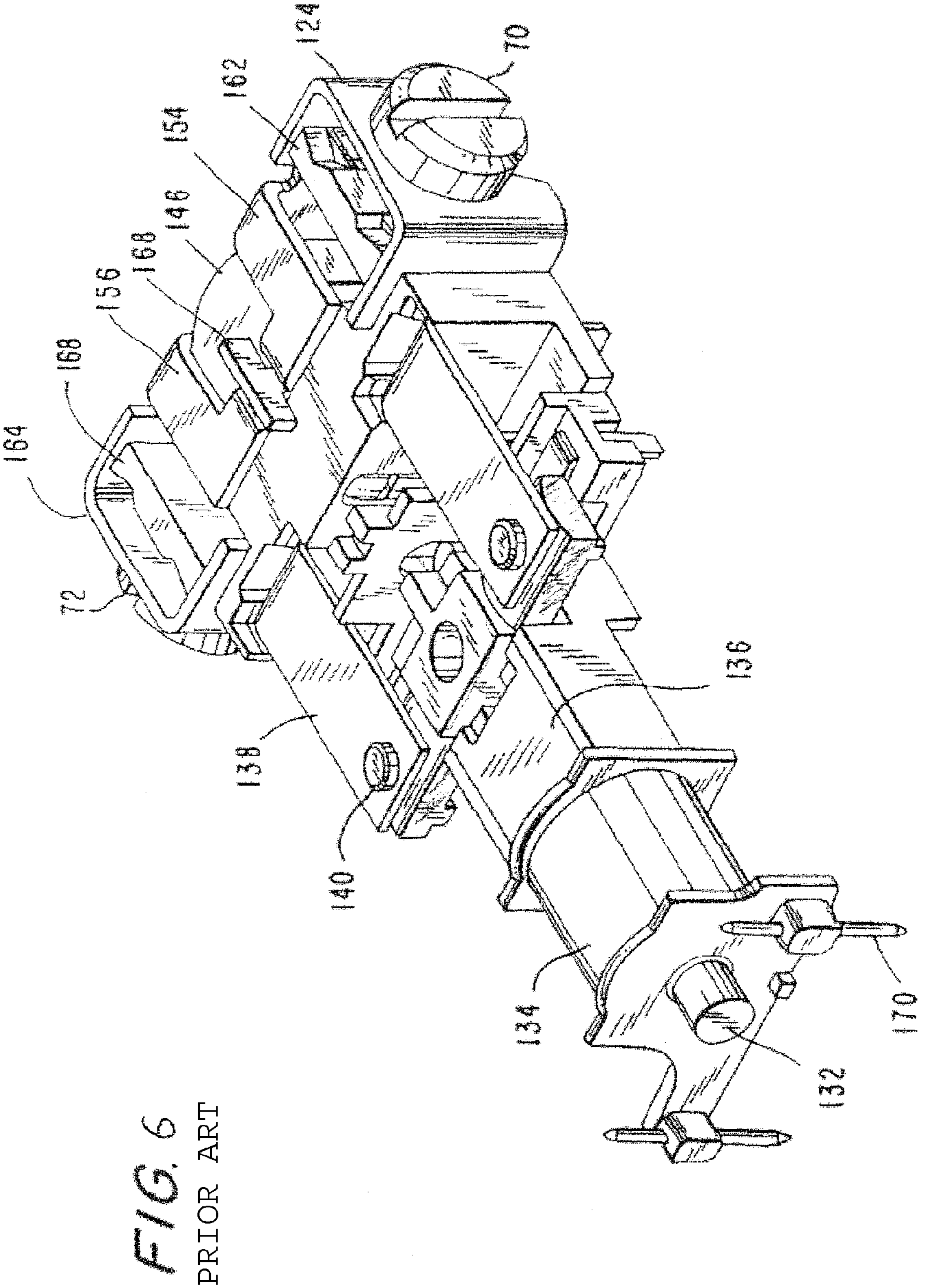
FIG. 6 PRIOR ART
FIG. 6 is a perspective view of the devices of FIG. 5 with the reset lever and PC board removed.
Figure 10:
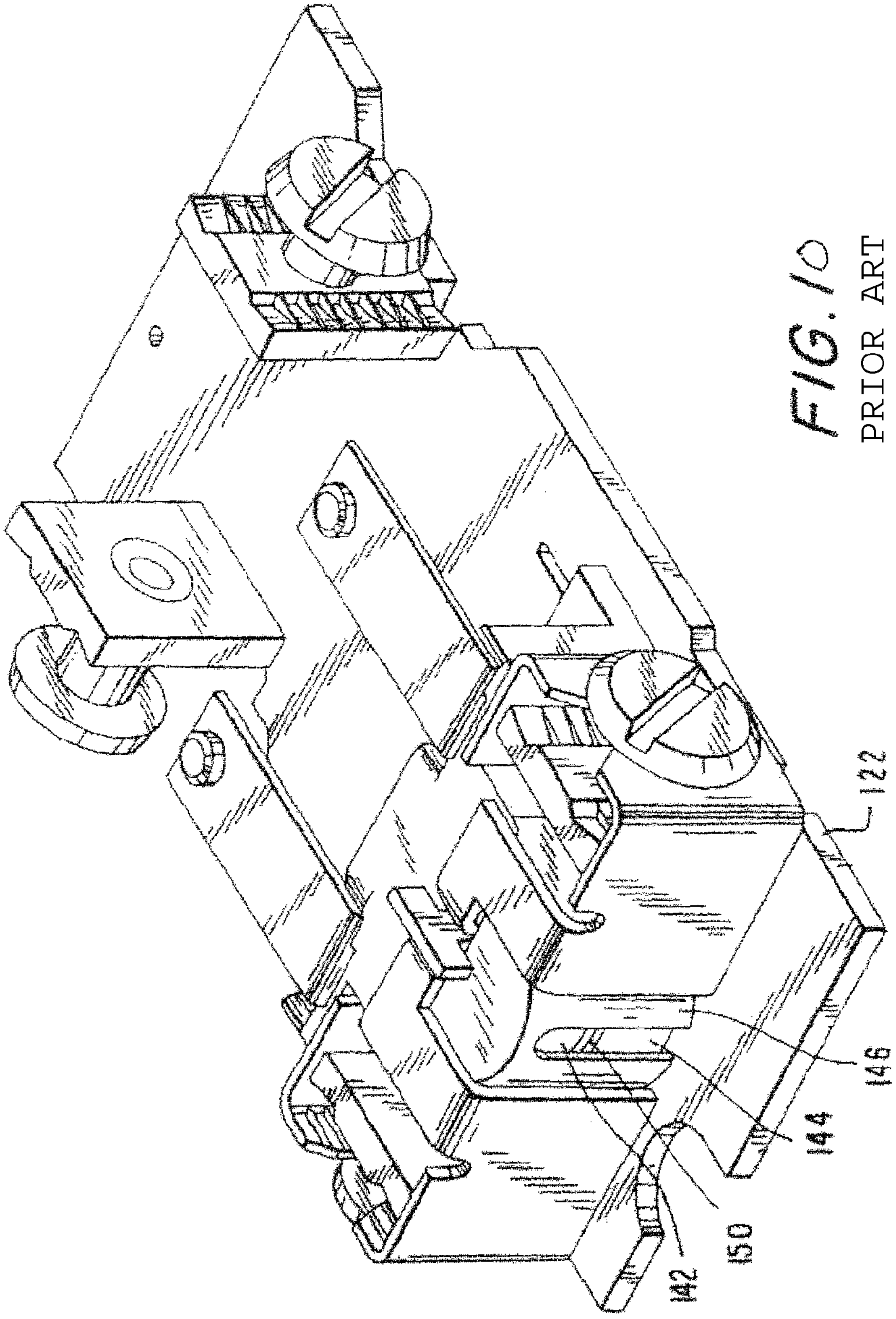
FIG. 10 PRIOR ART
FIG. 10 is a perspective view showing the transformers mounted on the printed circuit board of the device of FIG. 1.
Figure 11:
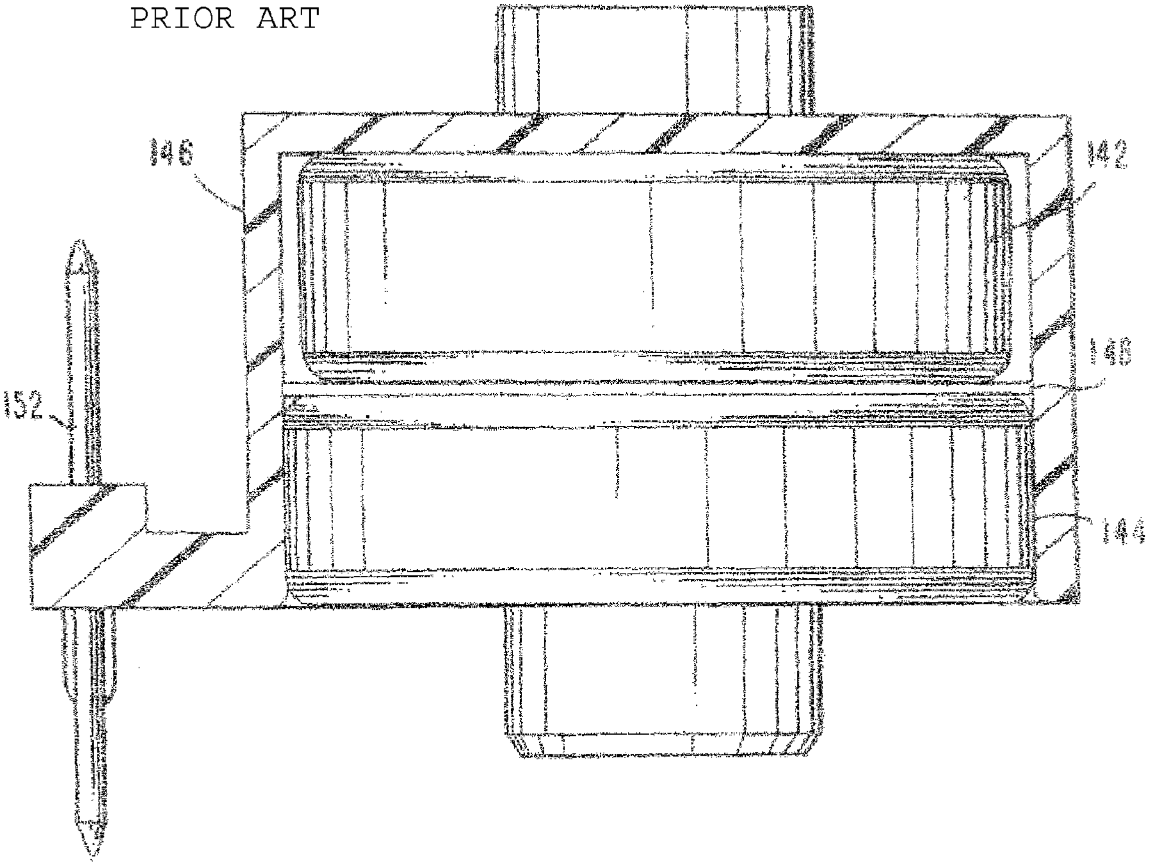
FIG. 11 PRIOR ART
FIG. 11 is a side elevational view partly in section of the transformer bracket assembly of FIG. 10.

Referring now to FIG. 5 the PCB 122 assembly and the reset assembly are shown with the housings removed. The reset assembly comprises a reset button 60, a reset lever 128 and a reset spring 130 and a latch pin to be described below with respect to FIGS. 15 to 19. A plunger 132 is positioned in the passageway of a solenoid coil 134. The plunger 132 is shown in its reset position extending partially out of the passageway of solenoid coil 134. When the solenoid coil 134 is operated by the circuits on the PCB 122, the plunger 132 is drawn further into solenoid coil 134. The plunger 132 controls the position of the latch plate to be described with reference to FIG. 9. The latch plate in cooperation with the latch pin and reset spring 130 move the lifter 136 upwardly in the direction shown by arrow 137 against the movable contact arms 138 to close the main movable contacts 140 to the main fixed contacts 108, 112 (see FIG. 4) on the underside of interned tabs 106, 110, respectively. The movable contact arms 138 are biased away from their associated interned tabs 106, 110 (biased in the direction shown by arrow 139) and when the latch pin is released, push the lifter 136 and latch plate downwardly in the direction shown by arrow 139 to move the movable contacts 140 away from their associated fixed contacts 108, 112. Also mounted on the PCB 122 is a neutral transformer 142 and a differential transformer 144 (not shown in FIG. 5). Only the neutral transformer 142 is shown in FIG. 5. Both transformers and the transformer bracket assembly 146 are shown in FIG. 11. Neutral transformer 142 is stacked upon differential transformer 144 with a fiber washer 148 therebetween. The bracket assembly 146 substantially surrounds the transformers 142, 144 except for a slot 150 as shown in FIG. 10 and slots into which conductors are placed. The leads for the windings of the transformers are brought out to four transformer pins 152 to which may be coupled the line and load conductors. The transformers will sense the current going to the load from the source and the current from the load back to the source. Any difference in current through these transformers is an indication that there is a fault in the circuit wiring. A device which can measure small differences in current and supply a fault signal is an integrated circuit available from many sources, for example, type number LM1851 from National Semiconductor or type number MC3426 from Motorola. This IC is located on PCB 122. The line neutral terminal 154 and the line phase terminal 156 have arms 158, 160 (see FIG. 8) which extend through the slots in the top of transformer bracket assembly 146. As shown in FIG. 6, terminal screw 70 extends through slot 126 of tab 124 that is part of line neutral terminal 154 and into a threaded aperture in nut 162 to thus connect the line neutral conductor (not shown) to the two transformers. The arms 158, 160 act as one turn windings for the transformers 142 and 144. The line phase conductor (not shown) is connected via terminal screw 72 to tab 164 which extends through a slot 166 in tab 164 into the threaded aperture of a nut 168. Tab 162 is part of the line phase terminal 156. An insulator extends between the arms 158, 160 to prevent shorting between them. The solenoid coil 134 is connected to two bobbin pins 170 to permit connection to PCB 122. FIG. 6 is similar to FIG. 5 but omits the PCB 122, the reset button 60, the reset lever 128 and the reset spring 130.

Figure 7:
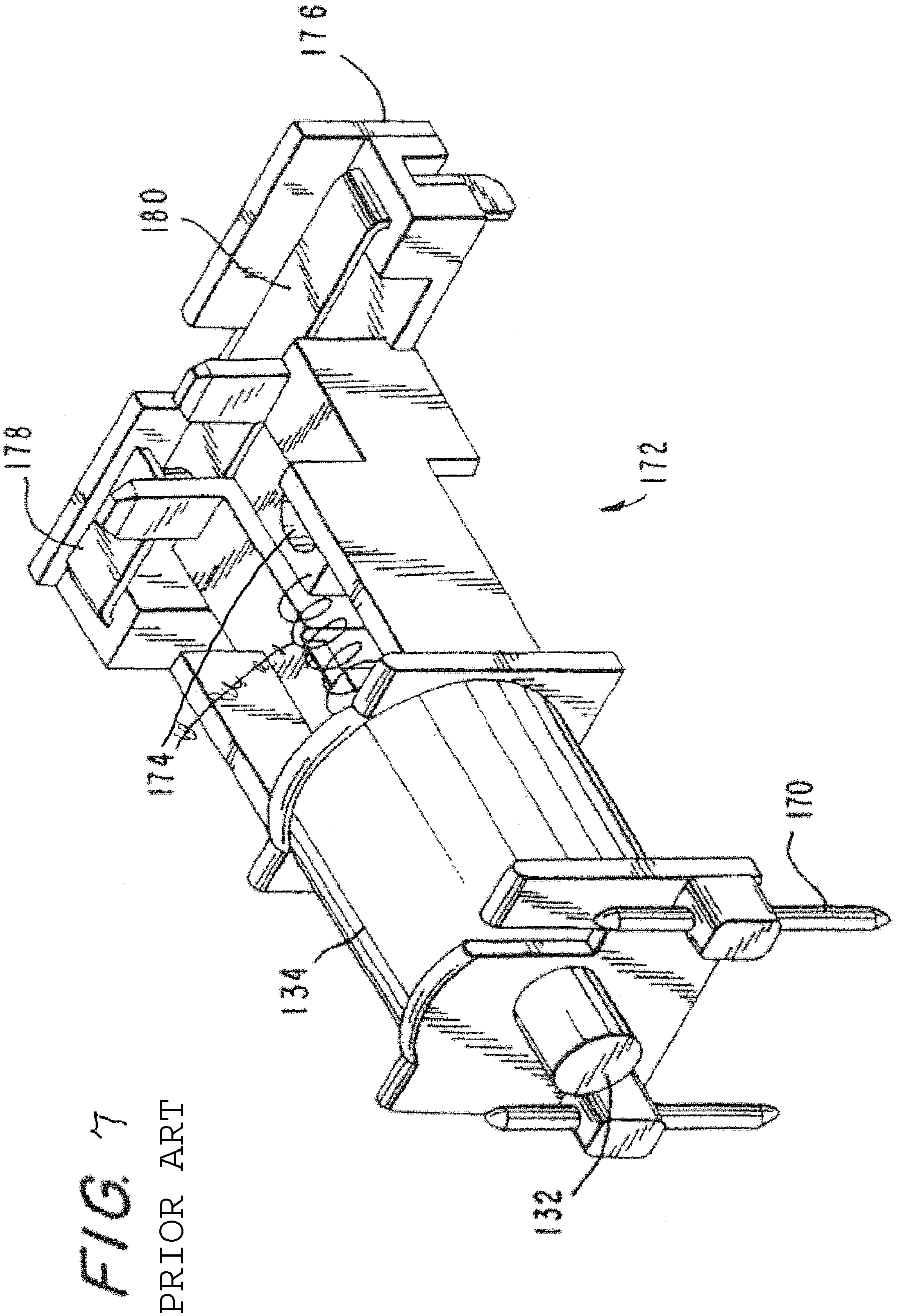
FIG. 7 PRIOR ART
FIG. 7 is a perspective view of the bobbin assembly of the device of FIG. 1.

FIG. 7 shows the bobbin assembly 172 having solenoid coil 134 connected to bobbin pins 170 and containing plunger 132 in its passageway. A chamber 174 receives the lifter 136 and supports the lifter 136 when in its low position. A cross member 176 supports the auxiliary switch made up of auxiliary fixed contact arm 178 and auxiliary movable contact arm 180. The auxiliary switch when auxiliary fixed contact 186 and auxiliary movable contact 188 are engaged provides power to various components on the PCB 122. The auxiliary switch, when auxiliary fixed contact 186 and auxiliary movable contact 188 are not engaged cut-off the power to the components on PCB 122 and prevent possible damage to the PCB 122 components. For example, if the signal to the solenoid coil 134 is repeatedly applied while the main contacts are open the solenoid coil 134 may burn out. The auxiliary movable contact arm 180 is biased towards auxiliary fixed contact arm 178 and will engage it unless forced to open the contacts.

Figure 8:
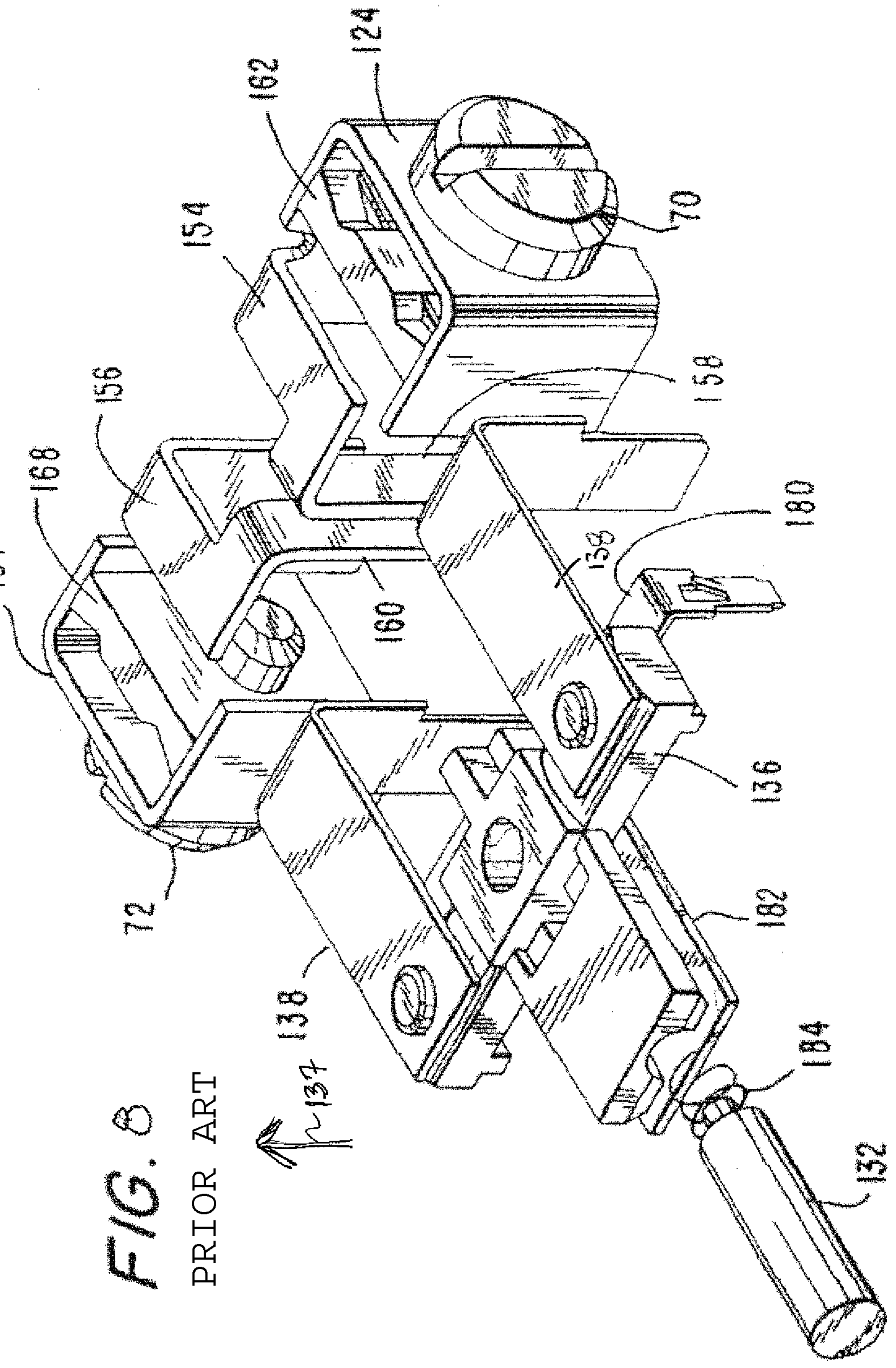
FIG. 8 PRIOR ART
FIG. 8 is a perspective view of the main movable contacts of the device of FIG. 1.

FIG. 8 shows the lifter 136 in contact with the movable contact arms 138 and positioned by the latch plate 182 which in turn is controlled by the plunger 132 and the plunger reset spring 184. The lifter 136 and latch plate 182 positions are dependent upon the reset lever 128 position as will be described below. The lifter 136 also controls the auxiliary movable contact arm 180. When the lifter 136 in its low position, the auxiliary movable contact 188 is moved away from contact with the auxiliary fixed contact 188 (not shown).

Figure 9:
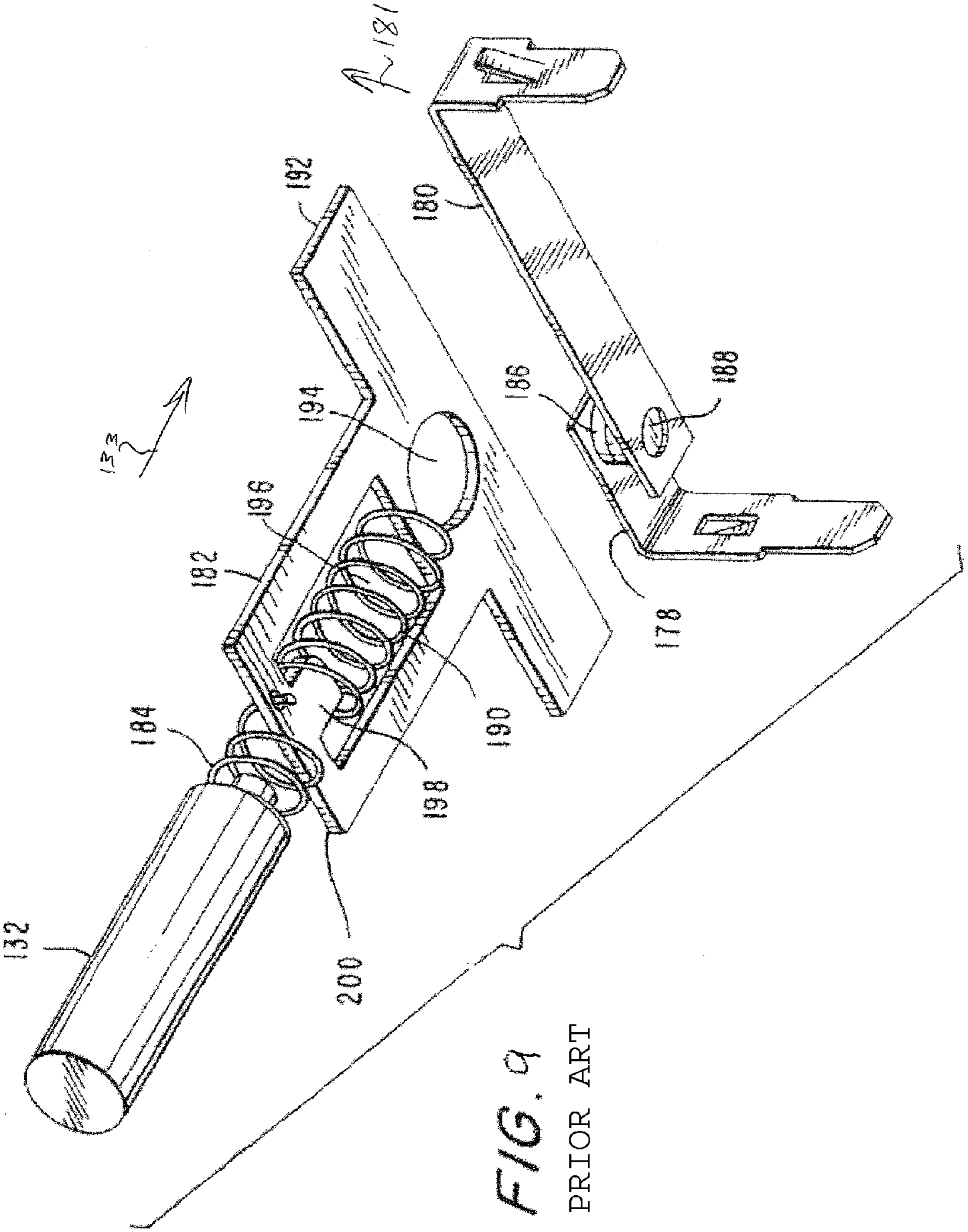
FIG. 9 PRIOR ART
FIG. 9 is a bottom perspective view of the plunger, latch plate and auxiliary contacts of the device of FIG. 1.

A latch plate return spring (not shown) resets the latch plate once the plunger 132 is reset as will be set out with respect to FIG. 9.

In FIG. 9 there is shown the latch plate 182, the plunger 132 and the auxiliary fixed arm 178 with auxiliary fixed contact 186 and the auxiliary movable arm 180 with auxiliary movable contact 188. Plunger reset spring 184 is anchored on the back edge 200 of latch plate 182 and the tab 198 extending into the rectangular opening 196. When the plunger 132 is moved to the right in FIG. 9 as a result of the activation of solenoid coil 134 the plunger reset spring 184 is compressed and expands to return the plunger 132 to its initial position partially out of the solenoid coil 134 as shown in FIG. 5 when the solenoid coil 134 is deactivated. Latch plate return spring 190 is connected between lifter 136 and tab 198 and is compressed by the movement of latch plate 182 to the right in FIG. 10 due to movement of plunger 132 to the right as well. When the plunger 132 is withdrawn, the latch plate return spring 190 expands to return the latch plate 182 to the left in FIG. 9. The arms 192 support arms of lifter 136. A central aperture 194 is oval in shape with its longer axis extending along a central longitudinal axis of latch plate 182. At the center of aperture 194, the aperture 194 is large enough for a latch pin (not shown) to pass through aperture 194 and move without engaging the lifter 136. At one of the smaller ends the latch pin is held by the latch plate 182 and causes the lifter 136 to move with the latch pin as will be described below. The auxiliary movable arm 180 is biased upwardly so that it brings auxiliary movable contact 188 into contact with auxiliary fixed contact 186 on auxiliary fixed arm 178. As will be described below an arm of the lifter 136 will engage the auxiliary movable arm 180 to push it downwardly in FIG. 9 to separate the auxiliary movable contact 188 from the auxiliary fixed contact 186 and open the auxiliary circuit.

Figure 12:
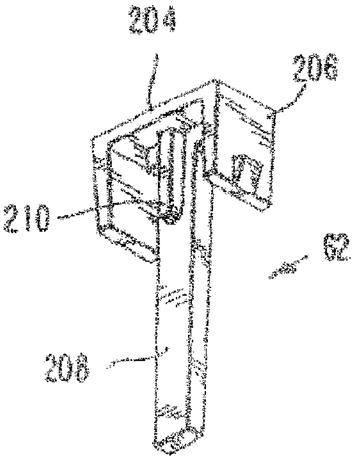
FIG. 12 PRIOR ART
FIG. 12 is a perspective view of the test lever and button of the device of FIG. 1.
Figure 13:
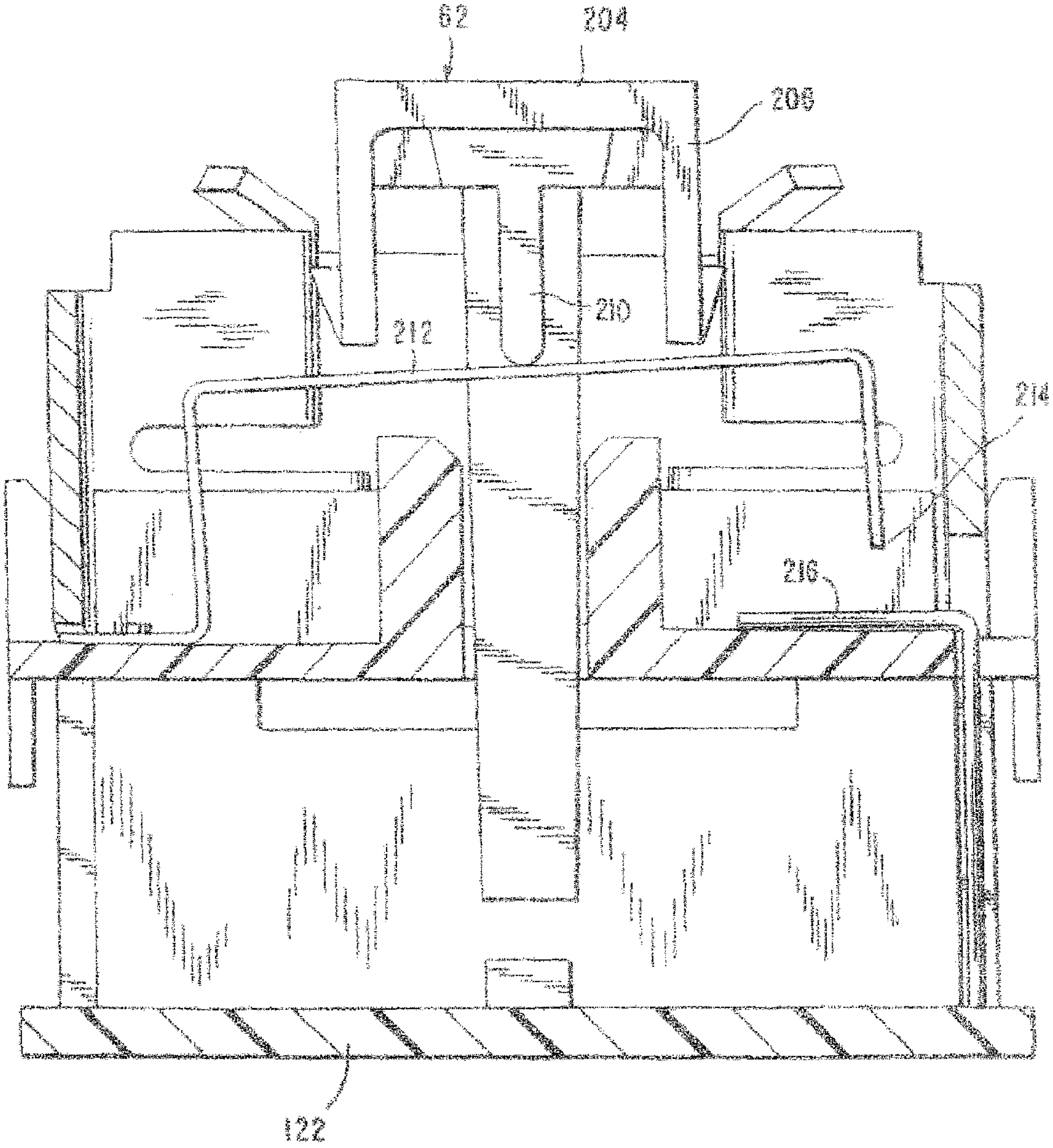
FIG. 13 PRIOR ART
FIG. 13 is a front elevational view of the test lever, test button, test arm and test pin in the open position.
Figure 14:
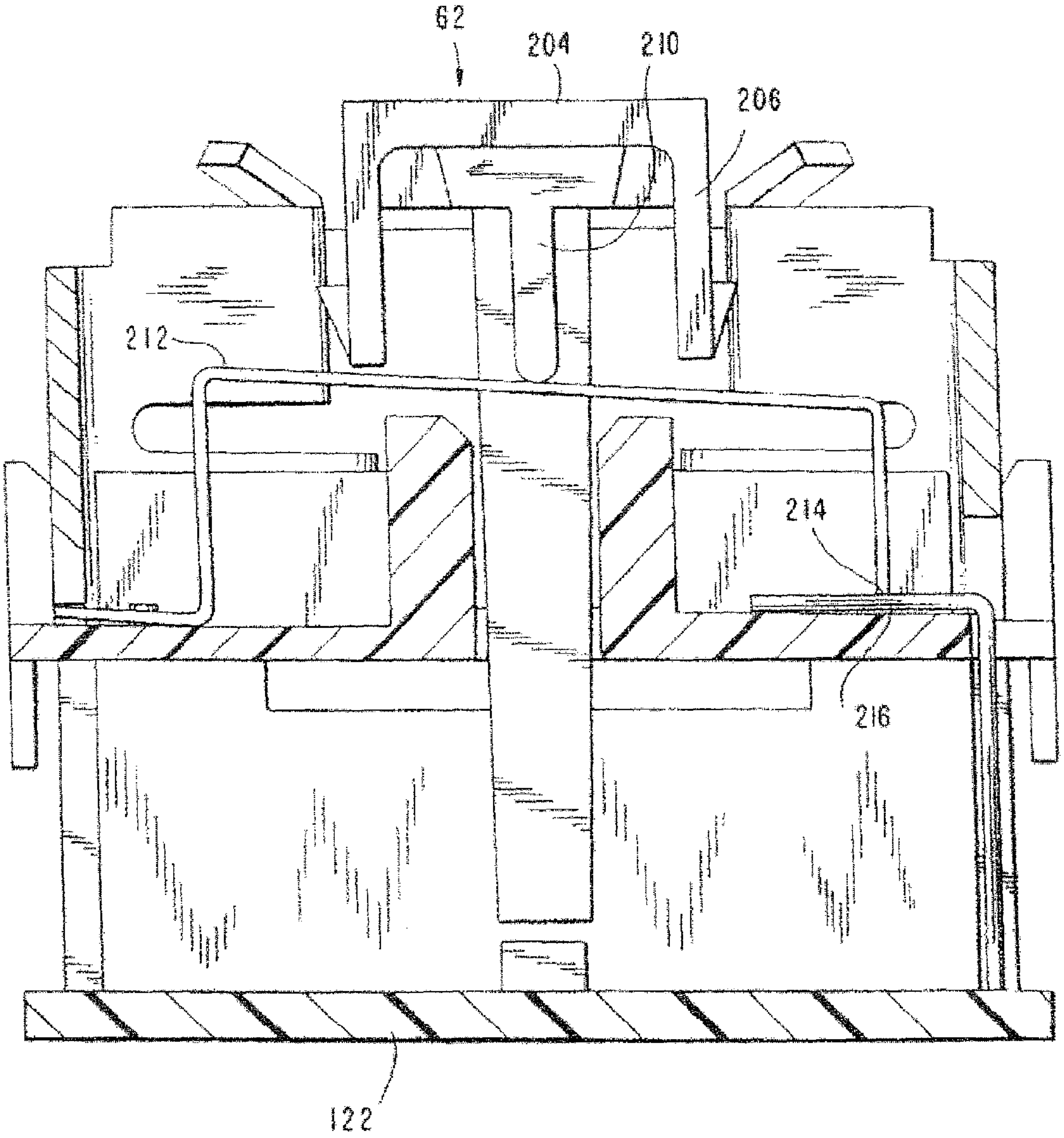
FIG. 14 PRIOR ART
FIG. 14 is a front elevational view of the components shown in FIG. 13 in the closed, test position.

Turning now to FIGS. 12, 13 and 14 the test button 62 is shown and its operation described. Test button 62 has a top member 204 from which extend side members 206. Also extending from top member 204 is a central lever 208 which contains a cam 210. The cam 210, when the test button 62 is depressed, engages a test arm 212 and moves its free end 214 into contact with test pin 216. The position of the test pin 216 is shown in FIG. 5. The test pin 216 is coupled to a small resistor and a lead which extends through one of the transformers 142, 144 to produce an unbalance in the power lines and cause the integrated circuit LM1851 to produce a signal to operate the solenoid 134 and thus simulate a fault. The test button return spring (not shown) returns the test button 62 to its initial position. FIG. 13 shows the reset position of test button 64 with cam 210 not depressing test arm 212 and the free end 214 separated from test pin 216. When the test button 62 is depressed as shown in FIG. 14, the cam 210 forces the free end 214 of test arm 212 downwardly into contact with test pin 216 to cause a simulated fault and operate the GFCI 30 to determine that the GFCI 30 is working properly. When released test button 62 returns to its reset position as shown in FIG. 13.

Figure 15:
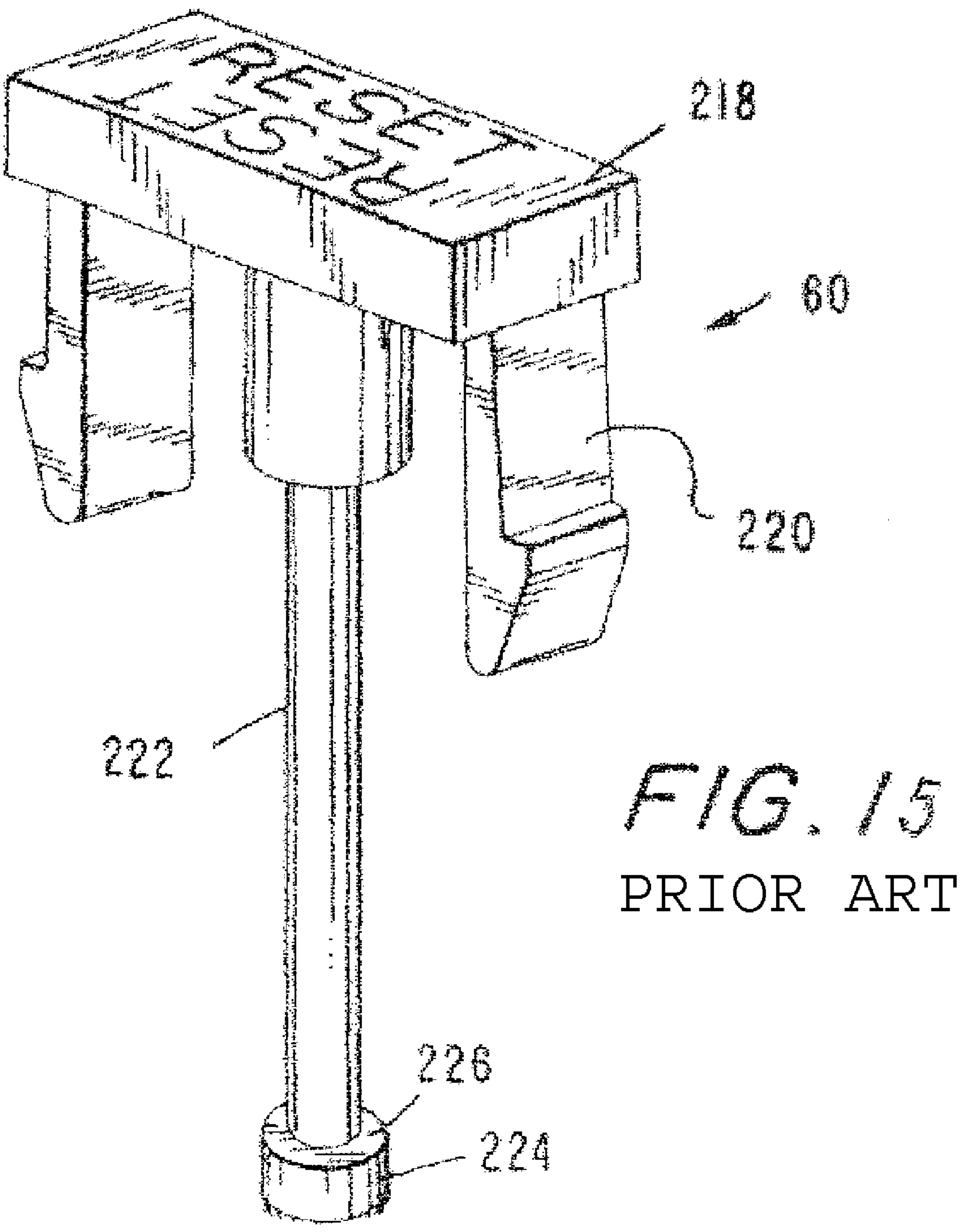
FIG. 15 PRIOR ART
FIG. 15 is a perspective view of the reset lever and reset button of the device of FIG. 1.
Figure 16:
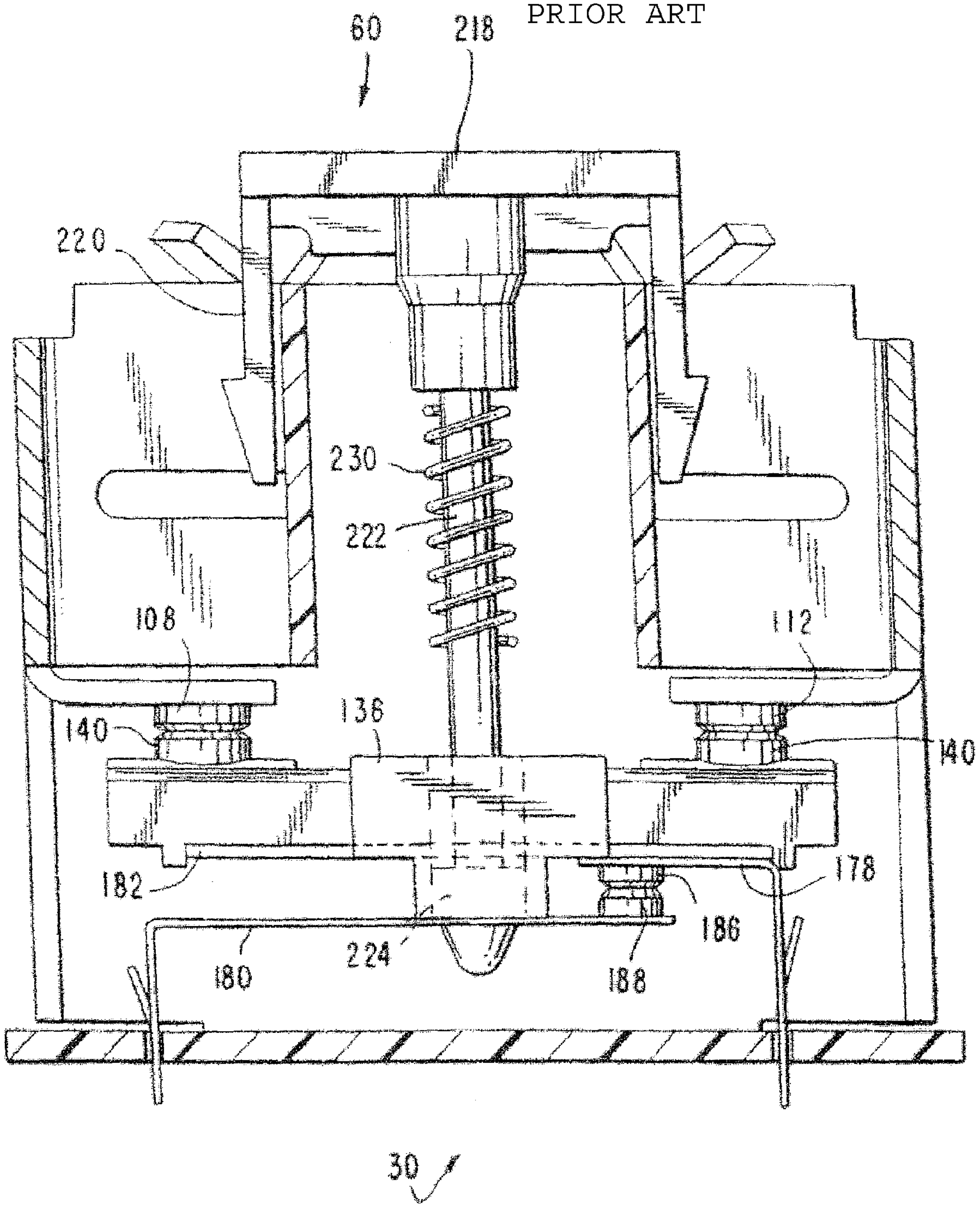
FIG. 16 PRIOR ART
FIG. 16 is a front elevational view of the reset lever reset button, main contacts and auxiliary contacts in the closed or reset condition.
Figure 17:
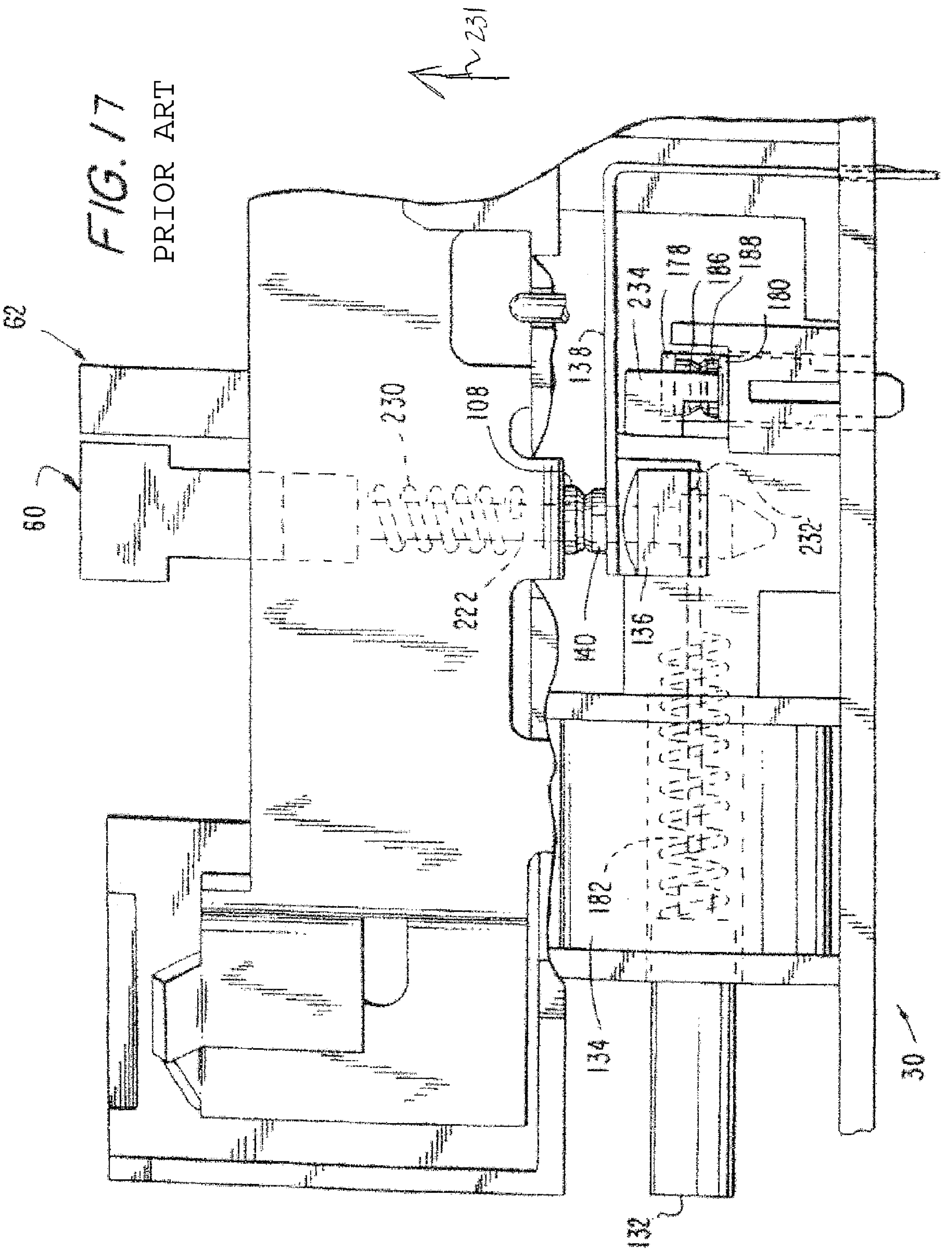
FIG. 17 PRIOR ART
FIG. 17 is a side elevational view of the device according to FIG. 16.

The reset button 60 is shown in FIG. 15. Reset button 60 has a top member 218 from which depend side members 220. Also extending from top member 218 is a latch lever 222 which ends in a latch pin 224. The diameter of latch pin 224 is greater than the diameter of the latch lever 222 resulting in a latch shoulder 226. A reset spring 230 surrounds latch lever 222 as shown in FIG. 16. FIGS. 16 and 17 show the GFCI 30 in its reset position. FIG. 16 is a rear view while FIG. 17 is a side elevational review. The surrounding structure is shown in light line to permit the switching components of GFCI 30 to stand out. In FIG. 17 the plunger 132 extends out of the solenoid coil 134 and the latch plate 182 is drawn to the left of the figure so that a smaller end of the oval aperture 194 engages the latch lever 222. The latch pin 224 (see FIG. 16) cannot be drawn through oval aperture 194. The leading end 232 of latch plate 182 rests upon the latch shoulder 226 and also is positioned under lifter 136. The reset spring 230 urges the latch lever 222 upwardly causing the lifter 136 to also move upwardly. This upward movement causes the movable contact arms 138 to also move upwardly bringing movable contacts 140 into contact with fixed contacts 108, 112 (see FIG. 16). The extension 234 of lifter 136 moves away from its contact with auxiliary movable arm 180 and the upwardly braised auxiliary movable arm 180 causes its auxiliary movable contact 188 to engage auxiliary fixed contact 186 on auxiliary fixed arm 178 and thus supply power to the PCB.

Figure 18:
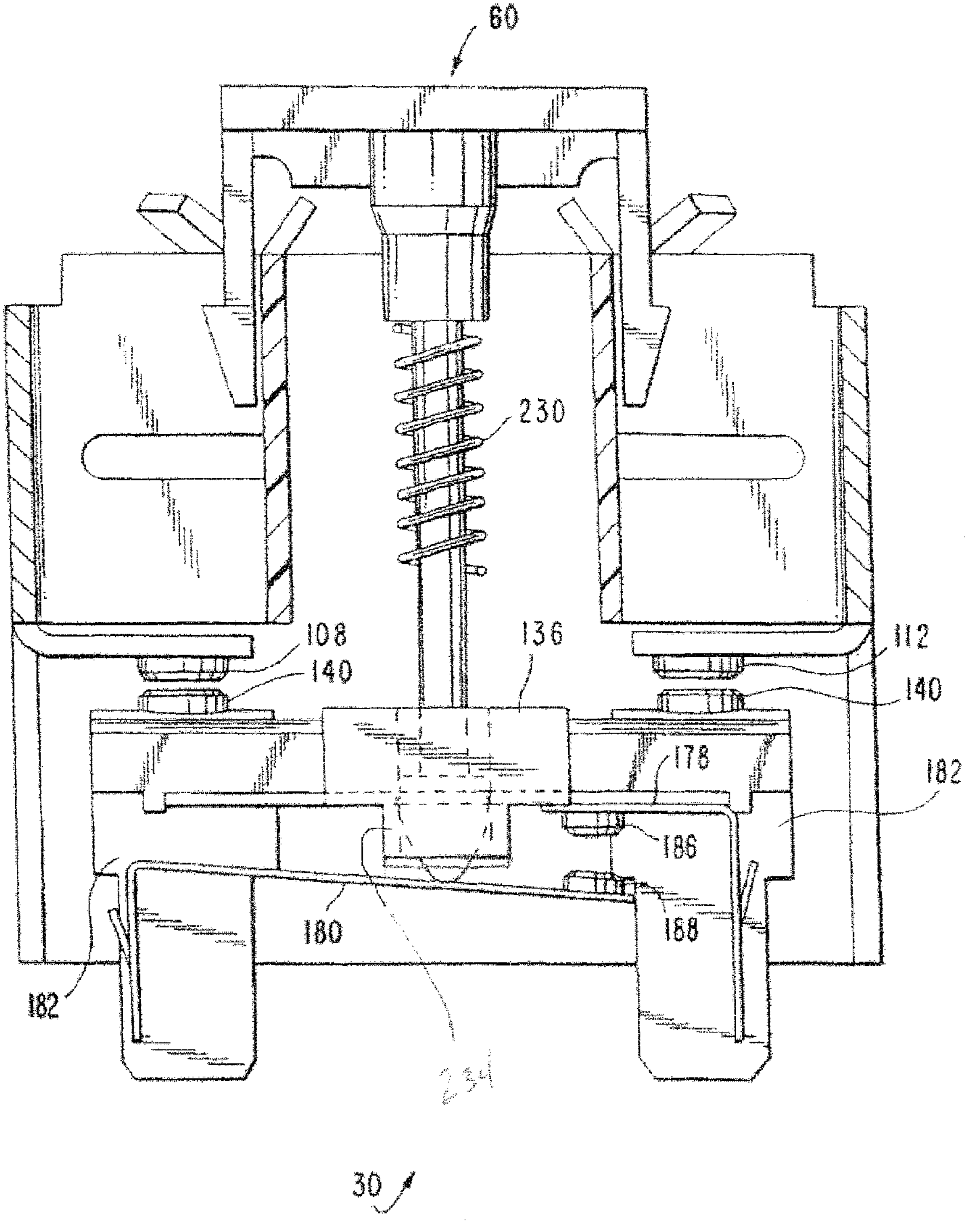
FIG. 18 PRIOR ART
FIG. 18 is a front elevational view of the components of FIG. 16 in the tripped condition.
Figure 19:
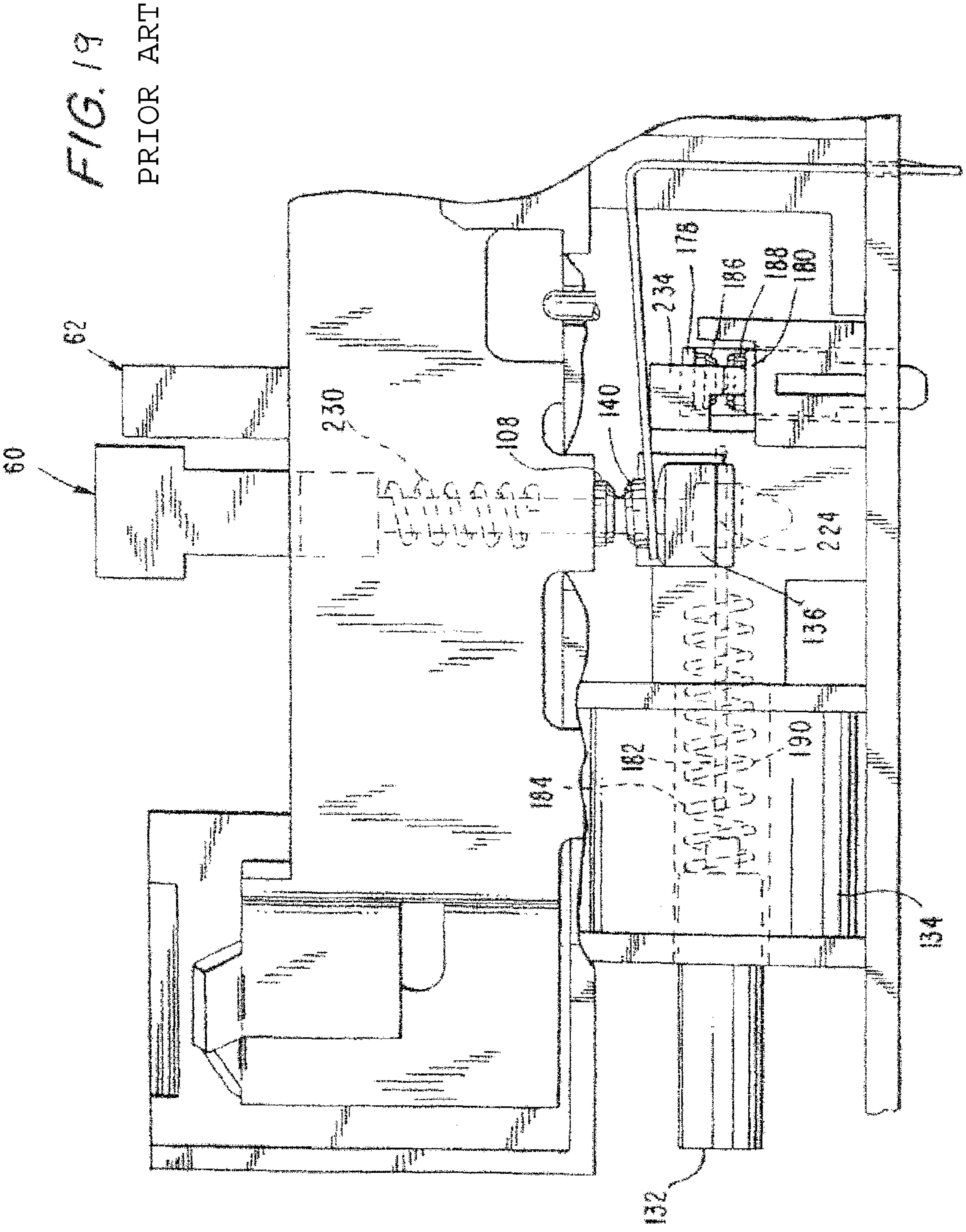
FIG. 19 PRIOR ART
FIG. 19 is a side elevational view of the device of FIG. 18.

In response to an internal or external fault or in response to a test employing test button 62, the GFCI 30, if working properly will go to a trip state shown in FIGS. 18 and 19 wherein both the main circuits and the auxiliary circuit will be opened. The presence of the trip condition is signaled by the circuits of the PCB. A signal will be supplied to the solenoid coil 134 which draws the plunger 132 further into solenoid coil 134. Plunger 132 causes the latch plate 182 to move to the right in FIG. 19 and places the central portion of oval aperture 194 over latch pin 224. In this position leading end 232 of the latch plate 182 no longer engages the latch shoulder 226 and the latch lever 222 is free to move through the oval aperture 194. As a result there is nothing to hold the movable contacts 140 on movable contact arms 138 in contact with fixed contacts 108, 112 on the fixed arms 106, 110, respectively. The movable contact arms 138, biased downwardly bear upon the lifter 136 moving it downwardly separating contacts 108, 112 and 140. The extension 234 bears against auxiliary movable arm 180 and causes its downward movement separating the auxiliary movable contact 188 from the auxiliary fixed contact 186 and opening the auxiliary circuit to supply power to the circuits on the PCB. The reset button 60 pops up as a result of the action of reset spring 230 to indicate that the GFCI 30 needs to be reset.

Figure 20:
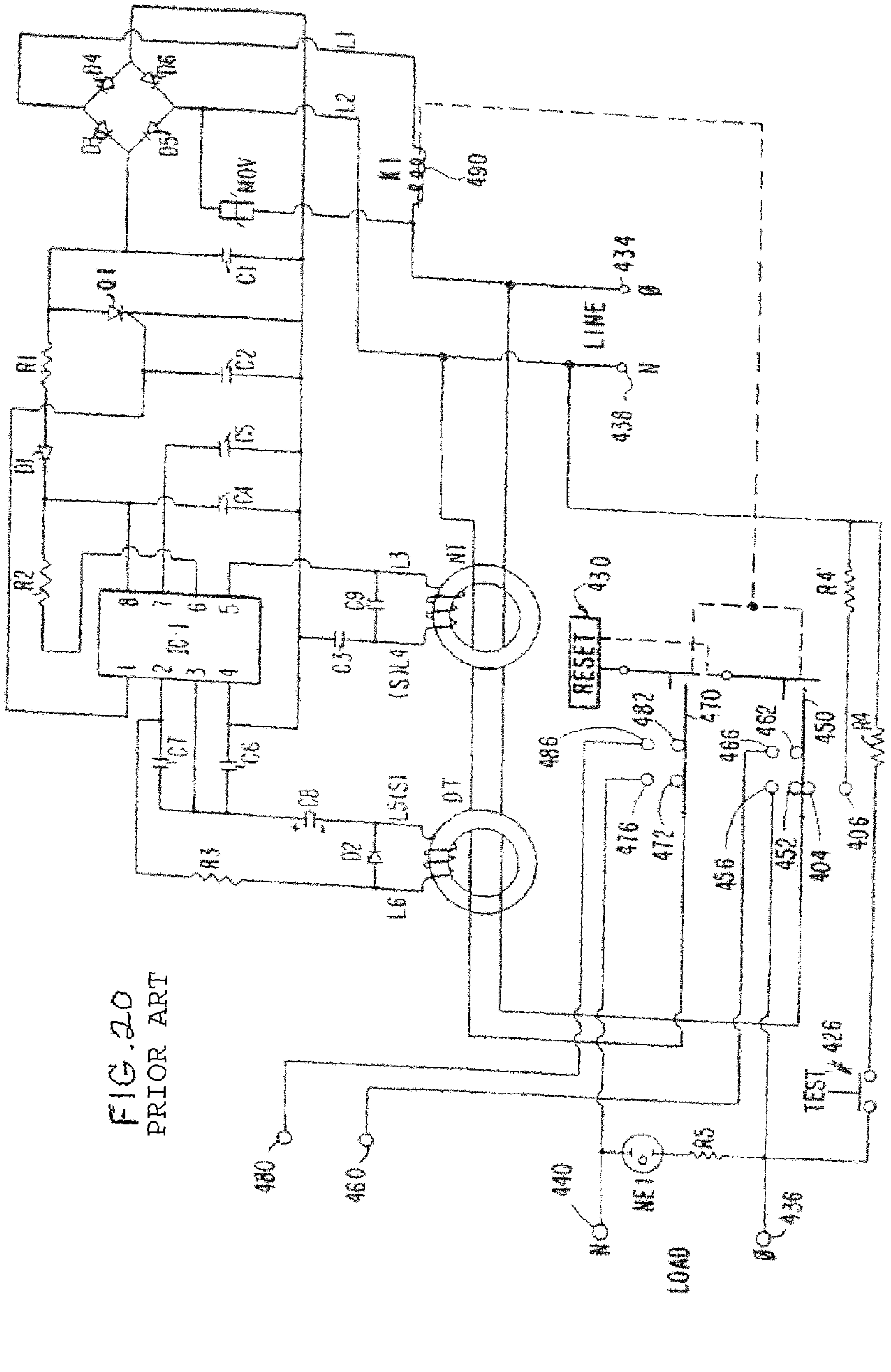
FIG. 20 PRIOR ART
FIG. 20 is a schematic diagram of a two button circuit for a GFCI having a bridge circuit and independent trip mechanism.
Figure 21:
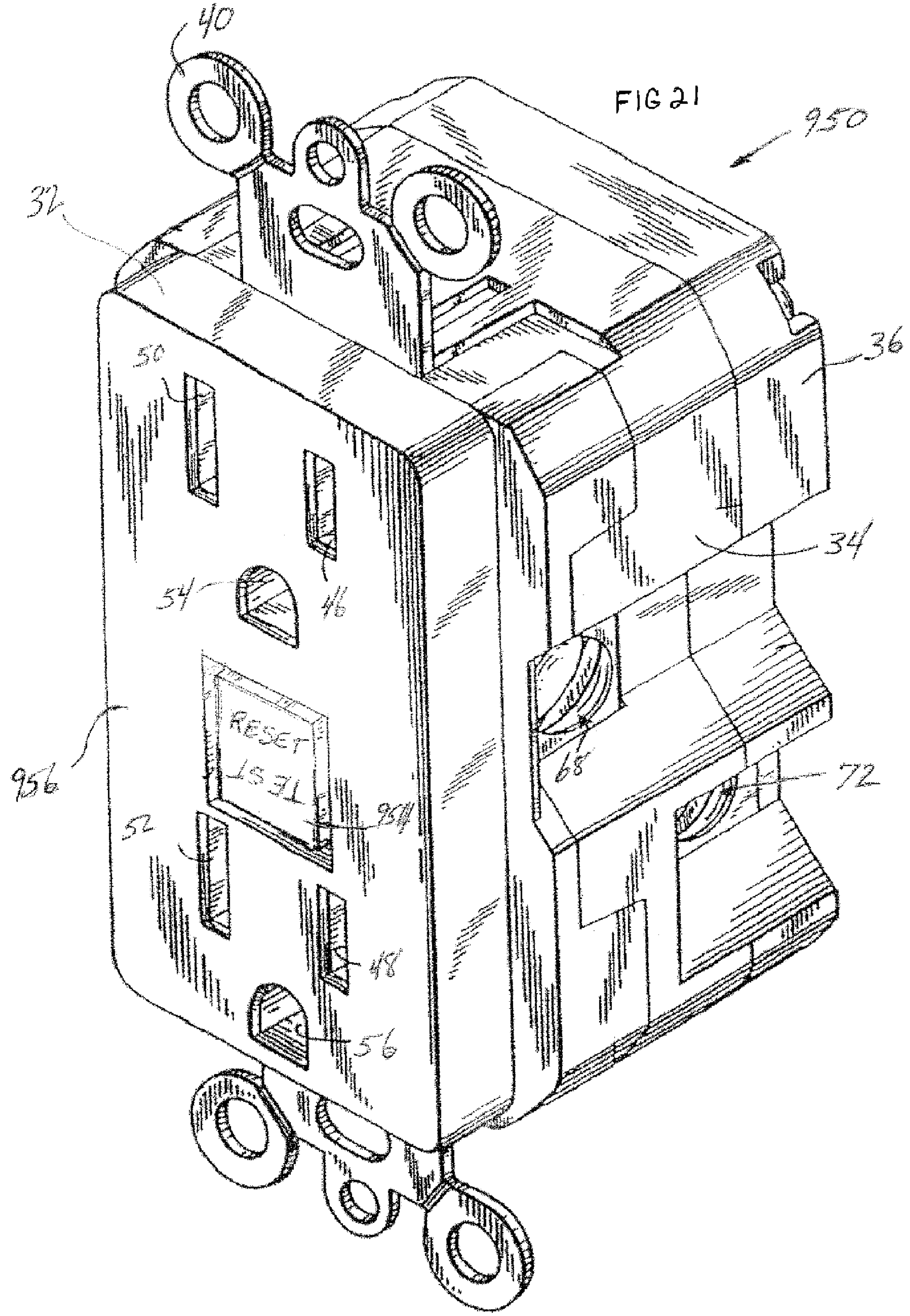
FIG. 21 is a perspective view of an embodiment of a ground fault circuit interrupting device according to the present application having a single user test-reset activation button.

Referring to FIG. 20, there is shown a schematic diagram of a GFCI having a bridge circuit with reset lockout and an independent trip mechanism is shown.

The device of FIGS. 1-19 has a reset mechanism that operates as follows. When the reset button is pressed down, the end of the reset pin centers the holes on the latch and the lifter, allowing the reset pin to go through the holes. Once the pin is through the holes, the latch spring moves the latch to its normal position. The device is then in a "reset position" (contact made between line & load). When the solenoid fires (due to a fault or by pressing the test button) the plunger opens the latch and releases the reset pin.

Figure 22:
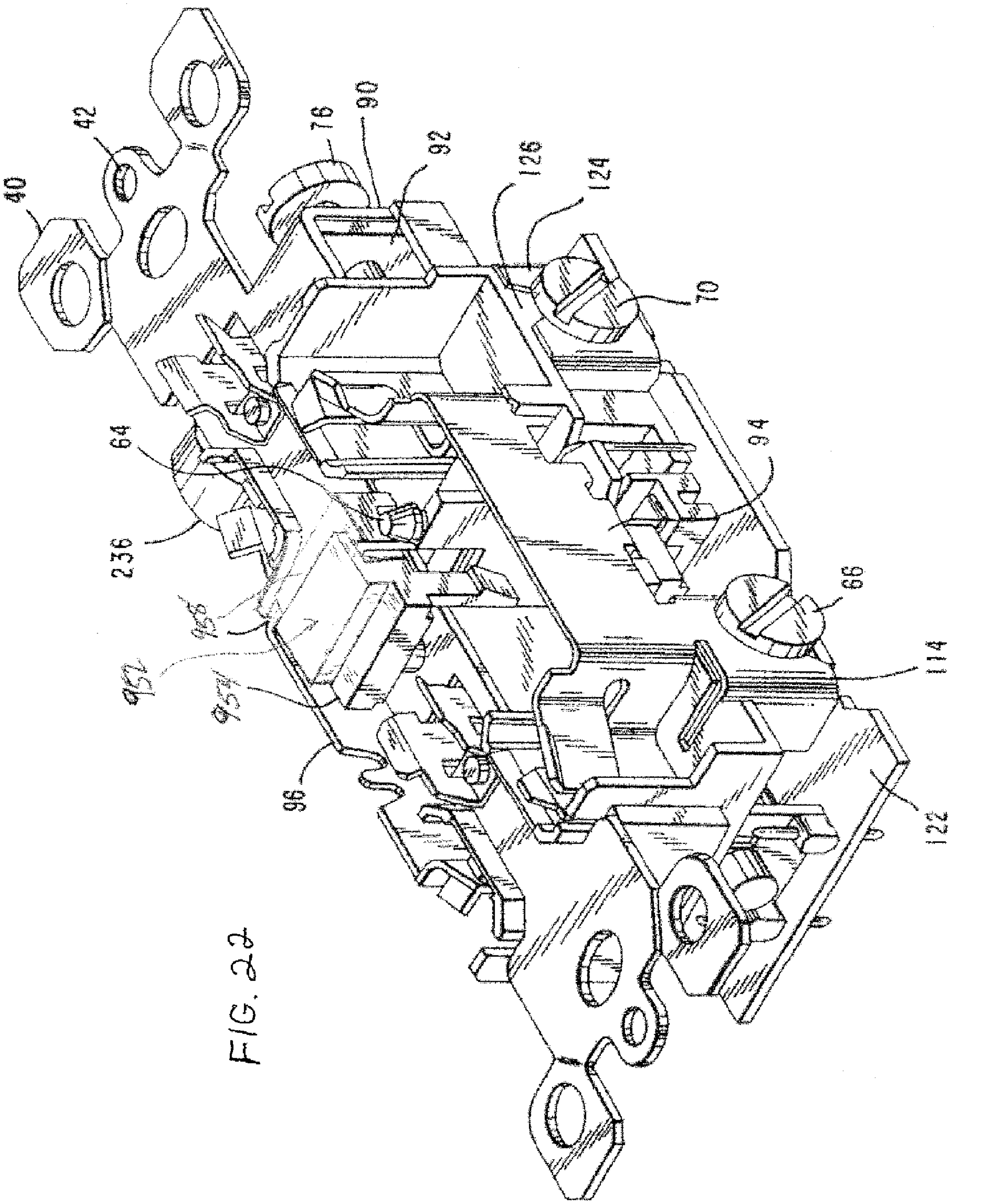
FIG. 22 is a perspective view of the device of FIG. 22 with the top and bottom covers removed.
Figure 23:
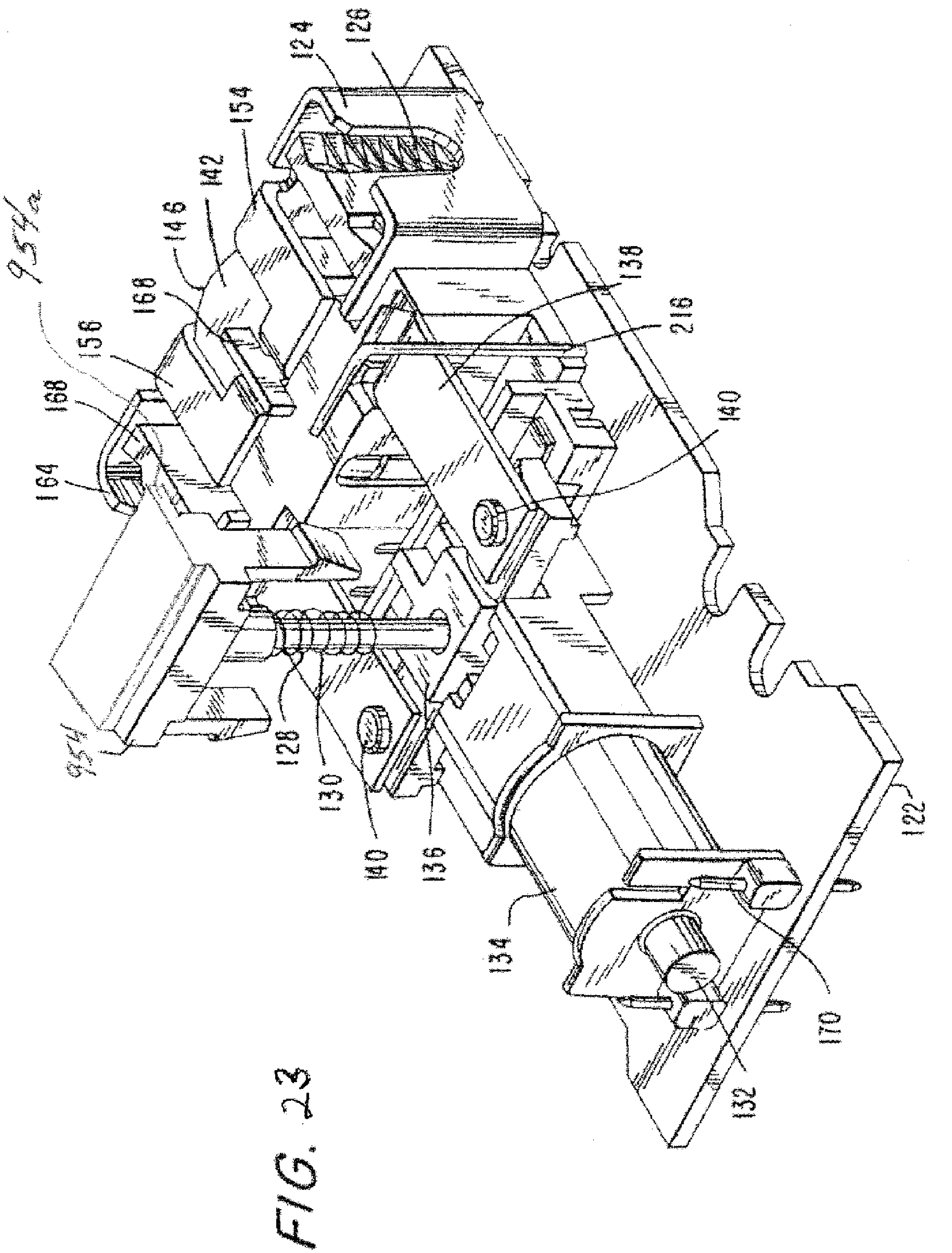
FIG. 23 is a perspective view similar to the printed circuit board and reset assemblies of FIG. 5, but for the device of FIG. 22.
Figure 24:
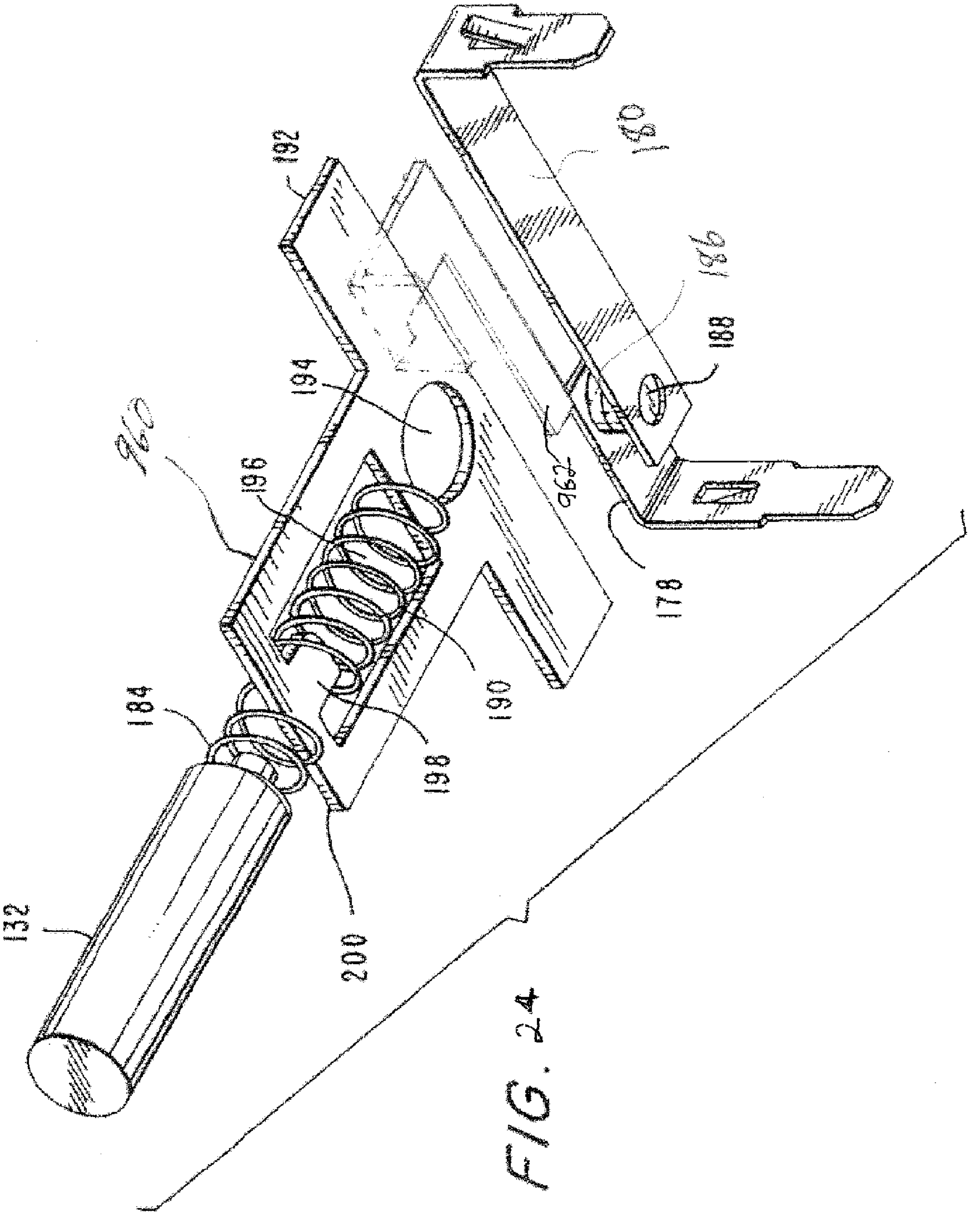
FIG. 24 is a bottom perspective view of the plunger, latch plate and auxiliary contacts similar to FIG. 9, illustrating an alternative embodiment for the latch plate used in the device of FIG. 22.

Referring now to FIGS. 21-27, there is shown a circuit interrupting device having a single test-reset button. Referring to FIGS. 21-24, the test-reset mechanism 952 includes button 954 extending through face plate 956 of housing 32, test actuator 958 and latch plate holder 980 (seen in FIG. 26). The latch plate holder is secured within the device housing by, for example, u-shaped member 982. Referring to FIGS. 22 and 23, button 954 is a modified version of the reset button 60 described above with reference to FIGS. 3 and 5. In this embodiment, button 954 includes an extension arm **954*a* that extends over at least a portion of the top member 970 of the test actuator 958 (seen in FIG. 25) so that when button 954 is depressed the test actuator 958 is activated. In FIG. 24 the latch plate 960 is substantially similar to the latch plate 182 described above with reference to FIG. 9, except the latch plate 960 includes an extension arm 962 configured to engage the latch plate holder 980** as described below.

Figure 25:
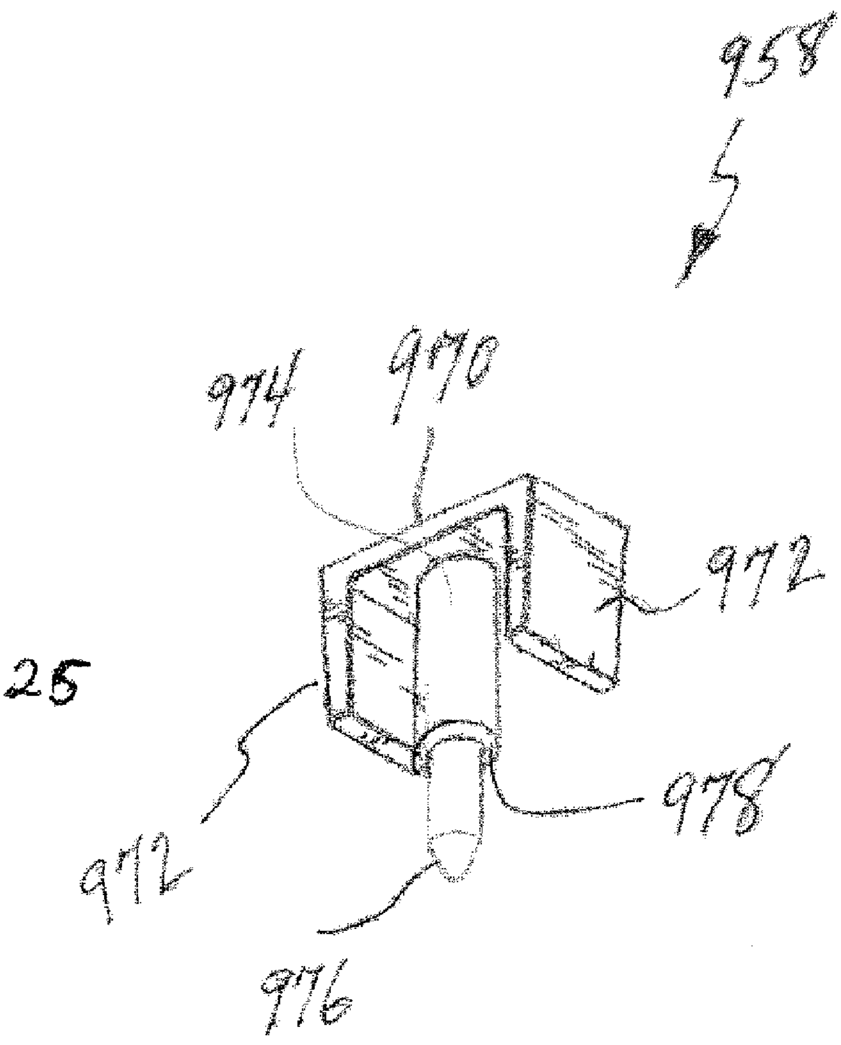
FIG. 25 is a perspective view of a test actuator used in the device of FIG. 22.

FIG. 25 is an illustration of an exemplary embodiment of the test actuator 958. In this embodiment, the test actuator has a top member 970 with extending side members 972, and a stepped test lever 974 having a tip 976. The surface at the step of the lever 974 forms a cam 978.

Figure 26:
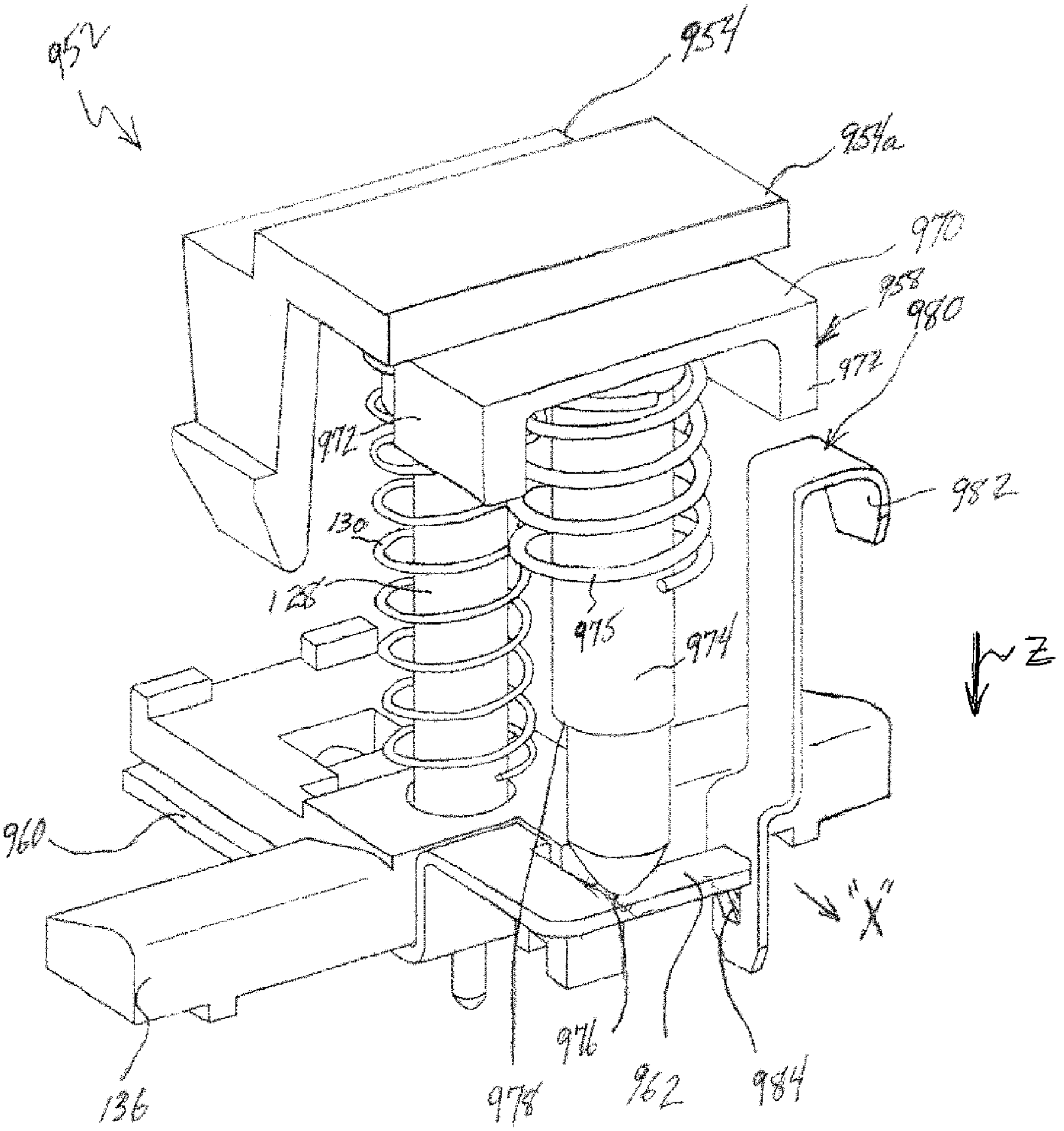
FIG. 26 is a schematic representation of the test-reset mechanism used in the device of FIG. 22 in the reset position.
Figure 27:
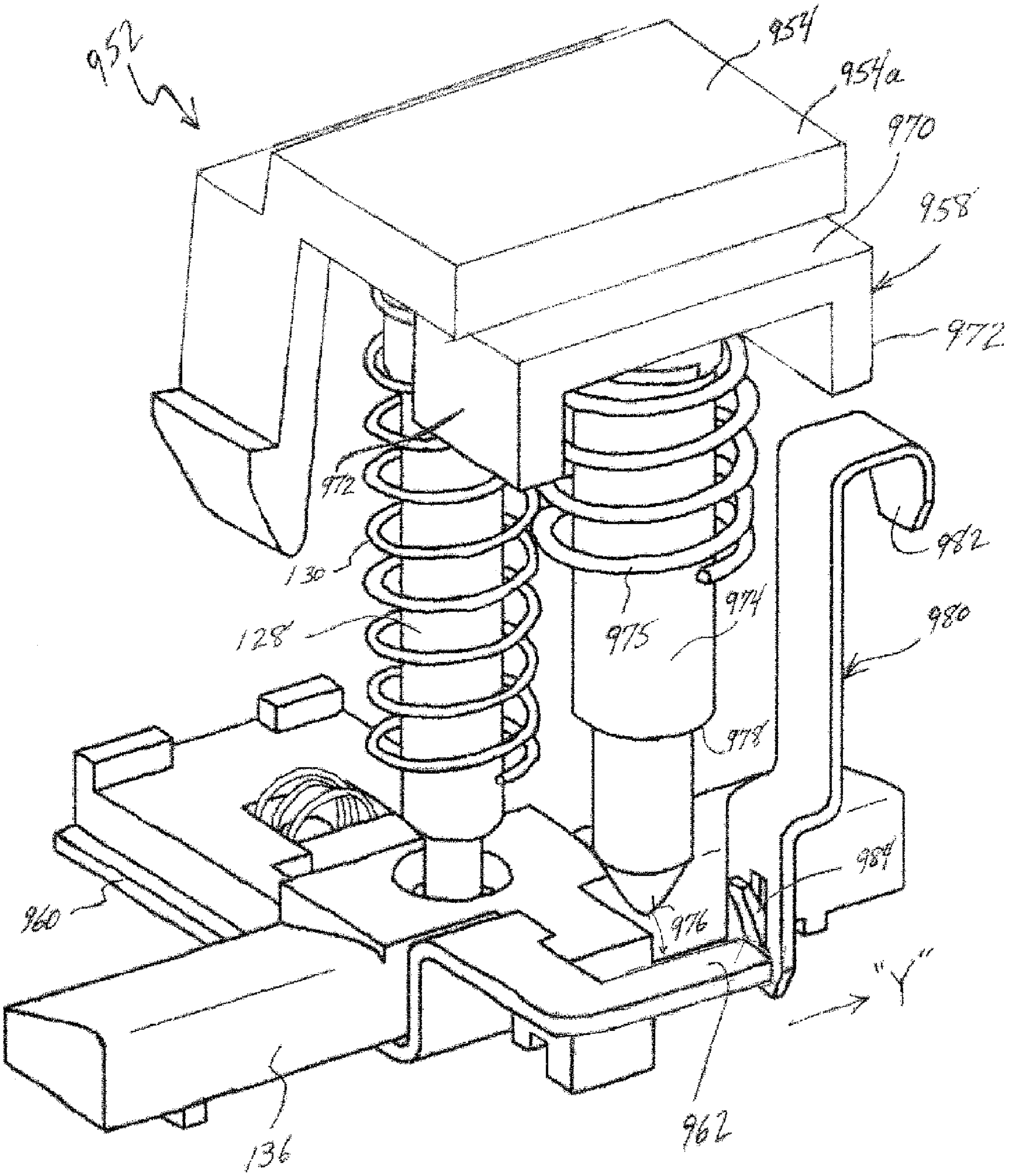
FIG. 27 is a perspective representation of the test-reset mechanism used in the device of FIG. 22 in the tripped position.

Turning now to FIGS. 25-27 the operation of the test-reset mechanism 952 and test actuator 958 will be described. When the device is in the reset state (or position) so that the device is providing power to the load phase and neutral terminals, the latch plate extension arm 962 rests upon angled tab or stop 984 of the latch plate holder 980, see FIG. 26, so that the latch plate 960 is held in an "up" position. At this time, the latch shoulder or stepped ring on the reset lever 128 is located below the latch plate and also holds the latch plate up. In this reset state, depression of the test-reset button 954 applies downward pressure on the reset lever 128 and also causes the test actuator 958 to apply downward pressure on the test lever 974 such that the angled tip 976 of test lever 974 engages the side edge of extension arm 962 of latch plate 960 and causes it to move in the direction "X". Because the extension arm 962 is resting on angled tab or stop 984, substantial movement of the reset lever 128 and test lever 974 is prevented and the device does not perform a reset operation. However, the downward pressure on the test lever 974 causes a slight movement of the test lever 974 so that the angled tip 976, as it engages the side edge of extension arm 962, causes arm 962 and the latch plate to move in the direction "X". As the extension arm and the latch plate move in direction "X", the extension arm is released from the angled tab and the leading end of the latch plate is moved so that it no longer engages the latch shoulder and the latch lever is free to move up through the oval aperture in the latch plate. When the latch lever 128 is released from the latch plate and moves up, the latch plate is free to move down and opens the contacts between the line and load terminals. As noted above, the latch plate can move down because, as the angled tip moves down and engages the side edge of the extension arm, it does two things. It moves the latch holder to the right in the direction indicated by "X" which causes the end of the latch holder to move off the angled tab 984 and, at the same time, releases the latch plate from the latch shoulder.

As described in more detail above with reference to FIGS. 18 and 19, when the device goes to its trip state (see FIG. 27), which is caused by the angled tip 976 moving down and engaging the side edge of extension arm 962 to move it in the direction "X" (see FIG. 26), the fixed and movable contacts open so that the device goes into its trip state.

With the extension arm 962 of latch plate 960 released from the angled tab on latch holder 980, depression of the test-reset button allows the device 30 to be reset as described above. When the device returns to the reset state, extension arm 962 of latch plate 960 is lifted up past the top of the angled tab 984 on latch holder 980 so that the latch plate is again held in the "up" position. It should be noted that while the extension arm 962 is being lifted over the top of angled tab or stop 984, the latch holder 980 may be configured to pivot in the direction of arrow "Y" (see FIG. 27) to make it easier for the extension arm 962 to move past the top of angled tab or stop 984.

It should be noted that, as with all of the embodiments provided herein, when performing a test operation of the device, all or part of the circuit interrupting portion or all or part of the reset portion or all or part of the reset lockout portion may be tested.

As noted, although the components used during circuit interrupting and device reset operations are electro-mechanical in nature, the present application also contemplates using electrical components, such as solid state switches and supporting circuitry, as well as other types of components capable or making and breaking electrical continuity in the conductive path.

While there have been shown and described and pointed out the fundamental features of the application, it will be understood that various omissions and substitutions and changes of the form and details of the device described and illustrated and in its operation may be made by those skilled in the art, without departing from the spirit and scope of the invention.

What is claimed:

1. A circuit interrupting device comprising:

a phase conductive path and a neutral conductive path each having a line side and a load side;

a circuit interrupter configured to cause the circuit interrupting device to change from a reset state to a trip state upon the occurrence of a predetermined condition;

a reset assembly configured to perform a reset operation when activated; and a single action test/reset assembly having a first shaft and a second shaft, and at least two springs with a first spring being coupled to said first shaft to form a spring loaded shaft, and a second spring being coupled to said second shaft to form a spring loaded shaft, said assembly which when activated is configured to perform a test operation when the circuit interrupting device is in the reset state which results in said circuit interrupter changing from a reset state to a trip state, and configured to perform a reset operation when the circuit interrupting device is in the trip state.

2. The circuit interrupting device according to claim 1 further comprising a reset lockout assembly that prevents the circuit interrupting device from changing from the trip state to the reset state if all or a part of the circuit interrupting assembly is non-operational, if an open neutral condition exists or if a reverse wiring condition exists.

3. The circuit interrupting device according to claim 1, wherein performance of the reset operation causes the circuit interrupting device to change from the trip state to the reset state.

4. The circuit interrupting device according to claim 1 wherein when the circuit interrupting device is in the trip state there is electrical discontinuity in the phase and neutral conductive paths between the line side and the load side.

5. The circuit interrupting device according to claim 1 wherein when the circuit interrupting device is in the reset state there is electrical continuity in the phase and neutral conductive paths.

6. The circuit interrupting device according to claim 1 wherein the single action test/reset assembly comprises a depressible button.

7. The circuit interrupting device according to claim 1 wherein the predetermined condition is one of a ground fault and an arc fault.

8. A circuit interrupting device comprising:

a housing;

a phase conductive path and a neutral conductive path each disposed at least partially within the housing between a line side and a load side, the phase conductive path terminating at a first connection capable of being electrically connected to a source of electricity, a second connection capable of conducting electricity to at least one load and a third connection capable of conducting electricity to at least one user accessible load, and the neutral conductive path terminating at a first connection capable of being electrically connected to a source of electricity, a second connection capable of providing a neutral connection to the at least one load and a third connection capable of providing a neutral connection to the at least one user accessible load;

a circuit interrupting assembly disposed within the housing and configured to cause the circuit interrupting device to change from a reset state to a trip state upon the occurrence of a predetermined condition;

a reset assembly disposed within the housing and configured to perform a reset operation when activated; and a single action test/reset assembly having a first shaft and a second shaft, and at least two springs with a first spring being coupled to said first shaft to form a spring loaded shaft, and a second spring being coupled to said second shaft to form a spring loaded shaft, said assembly being disposed at least partially within the housing and which when activated is configured to perform a test operation when the circuit interrupting device is in the reset state which results in said circuit interrupter changing from a reset state to a trip state, and configured to perform a reset operation when the circuit interrupting device is in the trip state.

9. The circuit interrupting device according to claim 8 further comprising a reset lockout assembly disposed within the housing that prevents the circuit interrupting device from changing from the trip state to the reset state if all or a part of the circuit interrupting assembly is non-operational, if an open neutral condition exists or if a reverse wiring condition exists.

10. The circuit interrupting device according to claim 8 wherein performance of the reset operation causes the circuit interrupting device to change from the trip state to the reset state.

11. The circuit interrupting device according to claim 8 wherein when the circuit interrupting device is in the trip state there is electrical discontinuity in the phase and neutral conductive paths between the line side and the load side.

12. The circuit interrupting device according to claim 8 wherein when the circuit interrupting device is in the reset state there is electrical continuity in the phase and neutral conductive paths.

13. The circuit interrupting device according to claim 8 wherein the single action test/reset assembly comprises a depressible button.

14. The circuit interrupting device according to claim 8 wherein the predetermined condition is a condition selected from the group consisting of a ground fault, an arc fault, an immersion detection fault, an appliance leakage fault, and an equipment leakage fault.

15. The circuit interrupting device according to claim 8, wherein said single action test/reset assembly comprises a reset actuator section and a test actuator section.

16. The circuit interrupting device according to claim 15, wherein said reset actuator section comprises a reset lever and a reset spring coupled to said reset lever, and wherein said test actuator section comprises a test lever, which is different from said reset lever, and a test spring coupled to said test lever.

17. A circuit interrupting device comprising:

a housing;

a phase conductive path and a neutral conductive path each disposed at least partially within the housing between a line side and a load side, the phase conductive path terminating at a first connection capable of being electrically connected to a source of electricity, a second connection capable of conducting electricity to at least one load and a third connection capable of conducting electricity to at least one user accessible load, and the neutral conductive path terminating at a first connection capable of being electrically connected to a source of electricity, a second connection capable of providing a neutral connection to the at least one load and a third connection capable of providing a neutral connection to the at least one user accessible load;

a circuit interrupting assembly disposed within the housing and configured to cause the circuit interrupting device to change from a reset state to a trip state upon the occurrence of a predetermined condition;

a reset assembly disposed within the housing and configured to perform a reset operation when activated; and a single action test/reset assembly disposed at least partially within the housing and which when activated is configured to perform a test operation when the circuit interrupting device is in the reset state which results in said circuit interrupter changing from a reset state to a trip state, and configured to perform a reset operation when the circuit interrupting device is in the trip state wherein said single action test/reset assembly comprises a reset actuator section and a test actuator section wherein said reset actuator section comprises a reset lever and a reset spring coupled to said reset lever, and wherein said test actuator section comprises a test lever, which is different from said reset lever, and a test spring coupled to said test lever wherein the device further comprises at least one latch plate which has an extension arm, wherein said extension arm is configured to stop said test lever from performing said reset operation when said single action test/reset assembly is first pressed when the device is in a reset state.

18. A circuit interrupting device comprising:

a housing;

a phase conductive path and a neutral conductive path each disposed at least partially within the housing between a line side and a load side, the phase conductive path terminating at a first connection capable of being electrically connected to a source of electricity, a second connection capable of conducting electricity to at least one load and a third connection capable of conducting electricity to at least one user accessible load, and the neutral conductive path terminating at a first connection capable of being electrically connected to a source of electricity, a second connection capable of providing a neutral connection to the at least one load and a third connection capable of providing a neutral connection to the at least one user accessible load;

a circuit interrupting assembly disposed within the housing and configured to cause the circuit interrupting device to change from a reset state to a trip state upon the occurrence of a predetermined condition;

a reset assembly disposed within the housing and configured to perform a reset operation when activated; and a single action test/reset assembly disposed at least partially within the housing and which when activated is configured to perform a test operation when the circuit interrupting device is in the reset state which results in said circuit interrupter changing from a reset state to a trip state, and configured to perform a reset operation when the circuit interrupting device is in the trip state wherein said single action test/reset assembly comprises a reset actuator section and a test actuator section wherein said reset actuator section comprises a reset lever and a reset spring coupled to said reset lever, and wherein said test actuator section comprises a test lever, which is different from said reset lever, and a test spring coupled to said test lever wherein the device further comprising at least one latch plate holder, wherein said latch plate holder is configured to stop said test lever from performing said reset operation and is also configured to translate a first axial movement of said test/reset assembly, into a second axial movement.

19. The circuit interrupting device as in claim 18, wherein said latch plate holder further comprises a stop, which stops said test lever from moving in a first axial direction when said test/reset assembly is first pressed when the device is in a reset state.

20. The circuit interrupting device as in claim 19, wherein when the device is in a trip state, said extension arm is positioned away from said stop, allowing the device to be reset into a reset state.

* * * * *

UNITED STATES PATENT AND TRADEMARK OFFICE

CERTIFICATE OF CORRECTION

PATENT NO. : 7,612,973 B2
APPLICATION NO. : 11/469314
DATED : November 3, 2009
INVENTOR(S) : Frantz Germain It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this

Nineteenth Day of October, 2010

David J. Kappos
*Director of the United States Patent and Trademark Office*